(12) United States Patent
Aono et al.

(10) Patent No.: US 11,851,542 B2
(45) Date of Patent: Dec. 26, 2023

(54) LAMINATED FILM

(71) Applicant: Toray Industries, Inc., Tokyo (JP)

(72) Inventors: Haruki Aono, Otsu (JP); Tadahiko Iwaya, Otsu (JP); Keiko Sawamoto, Otsu (JP); Yu Abe, Otsu (JP)

(73) Assignee: Toray Industries, Inc., Tokyo (JP)

( * ) Notice: Subject to any disclaimer, the term of this patent is extended or adjusted under 35 U.S.C. 154(b) by 564 days.

(21) Appl. No.: 17/259,430

(22) PCT Filed: Jul. 1, 2019

(86) PCT No.: PCT/JP2019/026059
§ 371 (c)(1),
(2) Date: Jan. 11, 2021

(87) PCT Pub. No.: WO2020/017289
PCT Pub. Date: Jan. 23, 2020

(65) Prior Publication Data
US 2021/0277197 A1 Sep. 9, 2021

(30) Foreign Application Priority Data

Jul. 17, 2018 (JP) ................................. 2018-133897
Sep. 3, 2018 (JP) ................................. 2018-164177
Dec. 26, 2018 (JP) ................................. 2018-242783

(51) Int. Cl.
| | |
|---|---|
| *C08J 7/04* | (2020.01) |
| *B05D 3/12* | (2006.01) |
| *B05D 5/08* | (2006.01) |
| *B05D 7/04* | (2006.01) |
| *C09D 5/20* | (2006.01) |

(52) U.S. Cl.
CPC .............. *C08J 7/0427* (2020.01); *B05D 3/12* (2013.01); *B05D 5/08* (2013.01); *B05D 7/04* (2013.01); *C09D 5/20* (2013.01); *B05D 2201/04* (2013.01); *B05D 2502/00* (2013.01); *B05D 2503/00* (2013.01); *B05D 2504/00* (2013.01); *C08J 2367/00* (2013.01); *C08J 2433/08* (2013.01); *C08J 2463/00* (2013.01); *C08J 2475/06* (2013.01)

(58) Field of Classification Search
None
See application file for complete search history.

(56) References Cited

U.S. PATENT DOCUMENTS

| | | | |
|---|---|---|---|
| 2010/0160562 A1* | 6/2010 | Beppu ....................... | C09J 7/401 |
| | | | 525/329.9 |
| 2015/0361235 A1* | 12/2015 | Funatsu ................... | C08J 7/043 |
| | | | 428/423.7 |

FOREIGN PATENT DOCUMENTS

| | | |
|---|---|---|
| JP | 10-6459 A | 1/1998 |
| JP | 2004-230772 A | 8/2004 |
| JP | 2004-351626 A | 12/2004 |
| JP | 2009-138101 A | 6/2009 |
| JP | 2009-231031 A | 10/2009 |
| JP | 2010-144046 A | 7/2010 |
| JP | 2010-155459 A | 7/2010 |
| JP | 2012-21201 A | 2/2012 |
| JP | 2014-151481 A | 8/2014 |
| JP | 2015-164797 A | 9/2015 |
| JP | 2015-199329 A | 11/2015 |
| KR | 10-2006-0093493 A | 8/2006 |

* cited by examiner

*Primary Examiner* — Jeffrey D Washville
(74) *Attorney, Agent, or Firm* — DLA Piper LLP (US)

(57) ABSTRACT

A laminated film has a resin layer on at least one surface of a polyester film, in which the resin layer is on at least one surface layer, the water contact angle of the resin layer is 85°-100°, inclusive, and |H2-H1|≤1.0 (%) is satisfied, H1 (%) being the haze of the laminated film and H2 (%) being the haze of the laminated film after being immersed in a solvent and subjected to a rub test. This laminated film has excellent coating and releasability properties with respect to ceramic slurry.

15 Claims, No Drawings

LAMINATED FILM

TECHNICAL FIELD

This disclosure relates to a laminated film including a polyester film and a resin layer disposed on at least one surface thereof.

BACKGROUND

Having good features in terms of mechanical properties, electric properties, dimensional stability, transparency, and chemical resistance, biaxially stretched polyester films have been used as base films of various products such as magnetic recording materials and packaging materials. In recent years in particular, there has been an increasing demand for films with high releasability that can serve as protective films for pressure sensitive adhesive layers in adhesive products or as carrier films used in processing various industrial products. As high releasability films, films composed mainly of a resin layer containing a silicone compound are most commonly used from the viewpoint of industrial productivity and heat resistance (see, for example, Japanese Unexamined Patent Publication (Kokai) No. 2010-155459). However, if a silicone compound is added to a resin layer, the surface free energy of the resin layer tends to decrease and accordingly, the spreadability of the adherend may deteriorate.

In particular, when a polyester film having a resin layer is used as a process film in manufacturing a laminated inductor element, the process will include a step of forming a ceramic slurry on a resin layer of a polyester film, a step of forming a coil pattern on this green sheet by the screen printing technique using a conductive paste, and a step of peeling the ceramic green sheet from the polyester film. In that instance, if a silicone compound is contained in the resin layer, the silicone compound can cause problems such as the occurrence of cissing and pinholes during the spreading of the ceramic slurry on the resin layer. In addition, even when there are no serious problems during the spreading step, the silicone compound can be transferred into the product and gradually vaporized and, as a result of arcs or the like that occur near electrical contacts in electronic components, it can be deposited on the surface of the electrical contacts to cause conduction failure that may have adverse influence on their performance.

To solve such problems, studies have been conducted on the use of a release agent containing no silicone compound (hereinafter referred to as non-silicone release agent) such as long chain alkyl group-containing resin, olefin resin, fluorine compound, and wax based, of which long chain alkyl group-containing resin is adopted most widely (see, for example, Japanese Unexamined Patent Publication (Kokai) No. 2004-351626, Japanese Unexamined Patent Publication (Kokai) No. 2014-151481, Japanese Unexamined Patent Publication (Kokai) No. 2004-230772 and Japanese Unexamined Patent Publication (Kokai) No. 2015-199329).

However, a non-silicone release agent tends to require a larger peeling force compared to a release agent containing a silicone compound, posing a difficult problem (hereinafter the tendency to require a larger peeling force will be referred to as increased peeling resistance). For example, we examined a film having a resin layer containing a non-silicone release agent as described in Japanese Unexamined Patent Publication (Kokai) No. 2004-351626 and found that when ceramic slurry was spread on the resin layer surface of the film, the ceramic slurry penetrated into the resin layer and lead to an increased peeling resistance of the ceramic slurry.

In addition, in using the films described in Japanese Unexamined Patent Publication (Kokai) No. 2014-151481 and Japanese Unexamined Patent Publication (Kokai) No. 2004-230772, we found that even when a long chain alkyl group-containing resin and a crosslinking agent were used in combination as the release agent incorporated in the resin layer, the resin layer failed to have an increased degree of crosslinking, depending on the type of crosslinking agent and processing conditions used, leading to the problem of an increased resistance to peeling of the ceramic slurry from the resin layer. On the other hand, we found that, when a long chain alkyl acrylate resin and a melamine resin were used in combination as the release agent incorporated in the resin layer, as described in Japanese Unexamined Patent Publication (Kokai) No. 2015-199329, it was possible to realize a high degree of crosslinking in the resin layer, but the surface free energy of the resin layer increased too largely to develop a sufficient degree of releasability, resulting in the problem of difficulty in the peeling of the ceramic slurry. Furthermore, a long chain alkyl group-containing resin tends to be high in hydrophobicity and its water dispersion is unstable and likely to aggregate so easily that its aggregate tends to be contained in the resin layer. Thus, we found that in some instances, bulky protrusions of the aggregate were transferred to the layer formed by coating and, as a result, the layer formed by coating had an increased surface roughness. Therefore, when a polyester film having a resin layer is used as a process film for manufacturing a laminated inductor element, for example, there tends to occur the problem of conduction failure in the laminated inductor element.

It could therefore be helpful to provide a laminated film having high spreadability of a coating composition such as a ceramic slurry used to form a layer by coating, ensuring high peelability of the layer formed by coating, particularly suffering little aggregation in the resin layer, and having high transferability and smoothness.

SUMMARY

We found that the use of a laminated film having specific physical properties provides a laminated film having high spreadability of a coating composition such as a ceramic slurry used to form a layer by coating of the laminated film and ensures high peelability of the layer formed by the coating.

We thus provide:

[I] a laminated film including a polyester film and a resin layer disposed on at least one surface thereof, wherein the resin layer is disposed on at least either of the outermost layers; the resin layer has a water contact angle of 85° or more and 100° or less; and the relation |H2−H1|≤1.0 (%) holds where H1 (%) represents the haze of the laminated film and H2 (%) represents the haze of the laminated film after solvent immersion and abrasion test,

[II] a laminated film as set forth in [I], wherein according to analysis of the surface of the resin layer by time-of-flight secondary ion mass spectrometry, the P/K ratio [-] is less than 0.01 where P represents the peak intensity of the fragment attributed to dimethyl siloxane and K represents the peak intensity attributed to the fragment detected with the maximum strength,

[III] a laminated film as set forth in either [I] or [II], wherein the resin layer is formed from a coating composition containing a release agent (A), at least one crosslinking agent (B) selected from the group consisting of epoxy resin, melamine resin, oxazoline compound, carbodiimide compound, and isocyanate compound, and at least one resin (C) selected from the group consisting of polyester resin, acrylic resin, and urethane resin,

[IV] a laminated film as set forth in [III], wherein the release agent (A) has an alkyl group containing 12 or more carbon atoms,

[V] a laminated film as set forth in [IV], wherein the resin having an alkyl group containing 12 or more carbon atoms is a resin having a polymethylene backbone chain and an alkyl side chain containing 12 or more carbon atoms,

[VI] a laminated film as set forth in any one of [III] to [V], wherein in the coating composition, the release agent (A) accounts for 5 to 50 parts by mass relative to the total amount of the crosslinking agent (B) and the resin (C), which accounts for 100 parts by mass,

[VII] a laminated film as set forth in any one of [III] to [VI], wherein in the coating composition, the mass ratio between the crosslinking agent (B) and the resin (C) is in the range of 5/95 to 50/50,

[VIII] a laminated film as set forth in any one of [III] to [VII], wherein the coating composition contains a compound (X) having a structure as represented by Equation (1),

[IX] a laminated film as set forth in [VIII], wherein the compound (X) has a weight average molecular weight of 1,000 or more and 20,000 or less,

[X] a laminated film as set forth in either [VIII] or [IX], wherein in the coating composition, the compound (X) accounts for 15 to 100 parts by mass relative to the release agent (A), which accounts for 100 parts by mass,

[XI] a laminated film as set forth in any one of [I] to [X], wherein the resin layer has a thickness of more than 10 nm and less than 80 nm,

[XII] a laminated film as set forth in any one of [I] to [XI], wherein the resin layer has a surface free energy of 20 mN/m or more and 30 mN/m or less,

[XIII] a laminated film as set forth in any one of [I] to [XII], wherein the resin layer is designed to provide a surface on which ceramic slurry is spread and solidified, followed by peeling,

[XIV] a laminated film as set forth in [XIII], wherein the ceramic slurry contains ferrite, and

[XV] a production method for a laminated film as set forth in any one of [I] to [XIV] including a step for spreading a coating composition containing a release agent (A) on at least one surface of a polyester film in which crystal orientation has not been completed, a subsequent step for stretching it at least uniaxially, and a subsequent step for heat-treating it to complete the crystal orientation in the polyester film.

We provide a laminated film having high spreadability of a coating composition such as a ceramic slurry used to form a layer by coating a resin layer in the laminated film, ensuring high peelability of the layer formed by coating, suffering little aggregation in the resin layer, and having high transferability and smoothness.

DETAILED DESCRIPTION

Our laminated film includes a polyester film and a resin layer disposed on at least one surface thereof, wherein the resin layer is disposed on at least either of the outermost layers; the resin layer has a water contact angle of 85° or more and 100° or less; and the relation $|H2-H1| \leq 1.0$ (%) holds where H1 (%) represents the haze of the laminated film and H2 (%) represents the haze of the laminated film after solvent immersion and abrasion test. First, the meanings of these physical properties and methods of their control are described below.

The water contact angle is determined by the static drop method specified in JIS R3257 (1999). For its determination, a water drop is placed on a solid surface maintained in an equilibrium state in the atmosphere and a calculation is made by the equation below. In general, this value serves as an indicator of the wettability of a solid surface. Specifically, a smaller water contact angle indicates that the solid surface is higher wettability whereas the wettability decreases as it increases.

$$\gamma S = \gamma L \cos\theta + \gamma SL$$

wherein γS is the surface tension of the solid material; γL is the surface tension of the liquid, γSL is the solid/liquid interface tension, and θ is the contact angle.

The above equation is called Young's formula and the angle formed between the liquid surface and the solid surface is defined as contact angle. The water contact angle can be measured by a widely commercial instrument and, for example, Contact Angle Meter (manufactured by Kyowa Interface Science Co., Ltd.) is useful for its measurement. Specific numeral ranges of the water contact angle and measuring methods will be described later.

Haze is the property that can be measured by the method specified in JIS K7136 (2000). This is generally used as an indicator of transparency and hiding property of an optical member, but we found that it can serve as an indicator in evaluating the degree of difference in the state of fine flaws and peeling of layers between before and after abrasion.

Controlling the value of |H2-H1|, where H1 (%) and H2 (%) represent the initial haze and the haze of the laminated film after solvent immersion and abrasion test, respectively, below 1.0% acts to ensure the simultaneous realization of spreadability and peelability of the coating composition used to form a layer on the resin layer by coating or the like (hereinafter, a layer formed by coating or the like on the surface of the resin layer of the laminated film will be occasionally referred to as the surface layer).

Solvent Immersion and Abrasion Test

After immersing the laminated film in methyl ethyl ketone for 10 minutes, a piece of cotton cloth (Haize Gauze NT-4, manufactured by Ozu Corporation) is moved back and forth ten times under a load of 1 kg to abrade the surface of the resin layer using a Gakushin type rubbing tester.

As described previously, a polyester film having a resin layer can serve in some instances as carrier film in processing of various industrial products. In such instances, when, for example, a polyester film having a resin layer is used as a process film in manufacturing a laminated inductor element, the process will include a step of forming a ceramic slurry on a resin layer of a polyester film, a step of forming a coil pattern on this green sheet by the screen printing technique or the like using a conductive paste, and a step of peeling the ceramic green sheet from the polyester film. If ceramic slurry is spread to form a surface layer on the resin layer of a laminated film, components of the ceramic slurry can penetrate into the resin layer in some instances. In the solvent immersion and abrasion test described above, immersing the laminated film in methyl ethyl ketone for 10 minutes is intended as an accelerated test to determine the degree of penetration of the dissolved binder components of the ceramic slurry into the resin layer that is expected to occur when the ceramic slurry is spread on the resin layer. Methyl ethyl ketone is an aliphatic ketone that is relatively small in molecular weight and molecular size and acts as a solvent to penetrate efficiently into the resin layer.

The operation of using a Gakushin type rubbing tester to move a piece of cotton cloth (Haize Gauze NT-4, manufactured by Ozu Corporation) back and forth ten times under a load of 1 kg along the surface of the resin layer is intended as an accelerated test to determine whether the resin layer, which is infiltrated with a solvent, suffers peeling by a physical force (that simulates an interfacial stress between the resin layer and the surface layer). For example, the resin layer may suffer a higher degree of peeling as the resin layer is infiltrated more deeply with methyl ethyl ketone (that simulates a binder component in the ceramic slurry). If peeling of the resin layer occurs, it gives rise to an increase in haze and therefore, the degree of peeling that occurs in the abrasion test can be determined from the difference in the haze value between before and after the abrasion test, i.e. |H2-H1|. Accordingly, a smaller difference in haze (|H2-H1|) between before and after the solvent immersion and abrasion test means smaller destruction of the resin layer caused by the penetration of a surface layer component into the resin layer or exertion of an interface stress between the resin layer and the surface layer. Controlling the value of |H2-H1| in the aforementioned range ensures that the coating composition prepared to form a surface layer on the resin layer by coating or the like can simultaneously realize appropriate spreadability and peelability. The Gakushin type rubbing tester refers to an apparatus that meets the specifications of the type II (Gakushin type) abrasion testing machine specified in JIS L-0849 (2017) and has the following features:

specimen bench: a semicylindrical metal bench with a surface radius of 200 mm friction block: a tubular block having a curved surface with a radius of 45 mm, length of about 20 mm, and width of about 20 mm horizontal reciprocating member: a member moved by a crank, handle or the like, horizontally back and forth 30 times per minute along a 120 mm long portion of the specimen bench.

The water contact angle and haze difference |H2-H1| of the laminated film can be controlled by, for example, altering the undermentioned components of the resin layer or the coating composition or the production method. Although their preferred ranges will be shown later, preferred physical properties to realize intended functions are described below.

The physical properties that contribute to the water contact angle are the constituents and surface profile of the outermost face. Compared to this, properties that contribute to the haze difference |H2-H1| include the average hardness in the portion ranging from the surface of the resin layer to the internal layer. In general, silicone or non-silicone release agents are low in surface energy and accordingly tend to be localized near the surface of the resin layer. However, by adding a compatibility-improving additive to the coating composition used to form a resin layer or altering the resin layer production process, it is possible to decrease the change in elastic modulus in the thickness direction of the resin layer or maintaining a uniform distribution of the constituent materials in the thickness direction, thereby decreasing the haze difference |H2-H1| and ensuring an appropriate peeling resistance and spreadability. The distribution of elastic modulus in the thickness direction can be determined by, for example, atomic force microscopy and the distribution of the constituent materials in the thickness direction can be determined by, for example, time-of-flight secondary ion mass spectrometry (GCM-TOF-SIMS).

Described below are specific numeral ranges of the water contact angle and haze difference |H2-H1|. It is necessary for the resin layer of the laminated film to have a water contact angle of 85° or more and 100° or less. Controlling the water contact angle of the resin layer at 85° or more allows the laminated film to have an appropriate releasability. If the water contact angle of the resin layer is less than 85°, its releasability will be so low that, for example, the ceramic slurry, which is spread and solidified on the resin layer, will show a large peeling resistance when peeling the ceramic slurry.

On the other hand, if the resin layer in the laminated film has a water contact angle of 100° or less, the spreadability of the ceramic slurry will be in a desirable range, thereby preventing the ceramic slurry formed on the resin layer from coming off naturally from the resin layer. If the water contact angle of the resin layer is more than 100°, it will be difficult to spread the ceramic slurry without causing defects such as cissing and pinholes and, in addition, the ceramic slurry may partly come off from the resin layer, leading to quality deterioration. It is more preferably 92° or more and 100° or less.

On the other hand, it is necessary that the relation |H2-H1|≤1.0 (%) holds where H1 (%) represents the haze of the laminated film and H2 (%) represents the haze of the laminated film after solvent immersion and abrasion test. It is more preferable that the relation |H2-H1|≤0.5 (%) holds and it is still more preferable that the relation |H2-H1|≤0.2 (%) holds. The relation |H2-H1|≤1.0 (%) means that the resin layer has a high degree of crosslinking and the distribution of elastic modulus and the distribution of the constituent materials are narrow and, accordingly, when spreading the ceramic slurry to the resin layer, the ceramic slurry will not penetrate easily into the resin layer, allowing the ceramic slurry to have a desirable peelability. When |H2-H1|>1.0 (%), the resin layer has a low degree of crosslinking or the distribution of elastic modulus and the distribution of the constituent materials are broad and, accordingly, when spreading the ceramic slurry on the resin layer, the ceramic slurry penetrates into the resin layer and causes an anchor effect between the resin layer and ceramic slurry, leading to a low peelability of the ceramic slurry. On the other hand, there are no specific lower limits on the value of |H2-H1|, but it is about 0.02% for practical measuring instruments.

The laminated film is described in detail below.

Polyester Film

The polyester film used as base film of the laminated film is described in detail below. The term "polyester" collectively refers to those polymers in which an ester bond forms the main bond chain in the backbone chain and it is preferable to use a polyester that contains, as the main component, at least one selected from ethylene terephthalate, propylene terephthalate, ethylene-2,6-naphthalate, butylene terephthalate, propylene-2,6-naphthalate, ethylene-α,β-bis(2-chlorophenoxy) ethane-4,4-dicarboxylate and the like. The use of polyethylene terephthalate as material of the polyester film is preferred. In a polyester film that suffers heat, shrinking stress or the like, it is particularly preferable to adopt polyethylene-2,6-naphthalate, which is high in heat resistance and rigidity.

In addition, the polyester may contain various additives including, for example, antioxidant, heat resistant stabilizer, weathering stabilizer, ultraviolet absorber, organic lubricant, pigment, dye, organic or inorganic particles, filler, antistatic agent, and nucleating agent, unless they impair its properties.

It is preferable for the above polyester film to be biaxially orientated. In general, a biaxially orientated polyester film can be produced by stretching an unstretched polyester sheet or film about 2.5 to 5 times in the length direction and in the width direction, which is perpendicular to the length direction, and subsequently heat-treating it to ensure completion of crystal orientation, and it gives a biaxially orientated pattern in wide angle X-ray diffraction observation. If the polyester film is not orientated biaxially, the resulting laminated film may fail to be sufficiently high in heat stability, dimensional stability and mechanical strength in particular, and may be low in planarity.

The polyester film itself may have a layered structure containing two or more layers. The layered structure may be, for example, a composite film structure composed of an inner layer and outermost layers, with the inner layer substantially being free of particles and the outermost layers containing particles. The polymer of the inner layer and that of the outermost layers may be of chemically different species or of the same species.

There are no specific limitations on the thickness of the polyester film and an appropriate thickness may be adopted according to the purpose and type of the film. Commonly, however, it is preferably 10 to 500 μm, more preferably 23 to 125 μm, and most preferably 38 to 75 μm, from the viewpoint of mechanical strength, handleability and the like. Furthermore, the polyester film may be a composite film produced by co-extrusion or one produced by combining separately prepared films by any of various available methods.

Resin Layer

The resin layer in the laminated film is located on at least either surface of the aforementioned polyester film. Pressure sensitive adhesive tape or ceramic slurry is put on the resin layer in the laminated film and then the undermentioned surface layer is peeled off from the laminated film. The resin layer is necessary to realize easy peeling in this step.

When analyzed by time-of-flight secondary ion mass spectrometry (GCIB-TOF-SIMS), the resin layer in the laminated film preferably gives a P/K ratio [-] of less than 0.01 where P represents the peak intensity of the fragment attributed to dimethyl siloxane and K represents the peak intensity attributed to the fragment detected with the maximum strength. The measuring method will be described in detail later, but if the peak intensity ratio is less than 0.01, the resin layer contains only a small amount of the component derived from dimethyl siloxane and accordingly, when the laminated film is used as a process film for manufacturing electronic parts, it suffers little transfer of silicone compounds (dimethyl siloxane in particular) to the product and prevents troubles such as electrical conduction failure.

For the resin layer in the laminated film, the film thickness is preferably more than 10 nm and less than 80 nm, more preferably 30 nm or more and 70 nm or less, and still more preferably 40 nm or more and 60 nm or less. If the film thickness of the resin layer is more than 10 nm and less than 80 nm, a resin layer with a uniform spreadability and releasability can be formed easily on a polyester film to allow the resin layer to have narrow distributions of elastic modulus and constituent materials, easily decreasing the value of |H2-H1|. If the film thickness of the resin layer is too large, not only the required production cost will increase, but also irregularities and streaks will occur easily during the coating step of resin layer formation, possibly resulting in a laminated film with poor quality. If the film thickness of the resin layer is too small, on the other hand, the aforementioned effect of increasing the degree of crosslinking in the resin layer will be reduced, possibly leading to a decrease in releasability.

There are no specific limitations on the method to be used to allow the laminated film to have a haze change (|H2-H1|) of less than 1.0 (%) between before and after the solvent immersion and abrasion test, but a major method is to produce it from a coating composition containing a release agent (A), at least one crosslinking agent (B) selected from the group consisting of epoxy resin, melamine resin, oxazoline compound, carbodiimide compound, and isocyanate compound, and at least one resin (C) selected from the group consisting of polyester resin, acrylic resin, and urethane resin. It will be described in detail in the section on the coating composition.

It is preferable for the resin layer in the laminated film to have a surface free energy of 20 mN/m or more and 30 mN/m or less. If the surface free energy of the resin layer is 20 mN/m or more, the resin layer can be coated with a surface layer without cissing, pinholes or the like and in addition, natural peeling of the surface layer can be prevented. If the surface free energy of the resin layer is 30 mN/m or less, furthermore, the peeling resistance of the surface layer can be reduced. It is more preferably 25 mN/or more and 30 mN/or less.

If the resin layer in the laminated film has a surface free energy of 20 mN/m or more and 30 mN/m or less, it is preferable because the binder component in the surface layer will be localized near the resin layer to cause phase separation as ceramic slurry is spread and solidified on the resin layer to form the surface layer. The method to be used to measure phase separation in the surface layer will be described later. In some instances where a plurality of such peeled surface layers, each peeled off from the resin layer in the laminated film, are used in a stack (such as where ceramic slurry layers containing ferrite are stacked and baked), the surface layers will be adhered favorably to each other if the surface layer undergoes such phase separation to form a structure in which the binder component in the surface layer is localized near one side. To produce a resin layer with a surface free energy of 20 mN/m or more and 30 mN/m or less in the laminated film, a typical method is to use the undermentioned resin layer components, coating composition, and production procedure.

Surface Layer

It is preferable for the laminated film to be used after forming a surface layer on the resin layer. The surface layer referred to above is a layer-like molded product containing resin, metal, ceramic material or the like formed on the surface of the resin layer in the laminated film. There are no specific limitations on the production method to be used to produce a surface layer, but it can be formed on the surface of the resin layer by such a technique as coating, deposition, pasting and the like. When a coating liquid containing a solvent component is used to form the surface layer and the surface layer is a cured layer produced by reacting reactive active sites, such a layer is occasionally referred to as a surface layer regardless of whether it is in an undried state or uncured state. For particularly preferred uses of the surface layer, it is in the form of a ceramic sheet produced by carrying out a step that includes the spreading of a coating composition containing ceramic slurry.

Coating Composition

Preferred coating compositions for forming a resin layer in the laminated film are described below.

It is preferable for the resin layer in the laminated film to be formed from a coating composition containing a release agent (A), at least one crosslinking agent (B) selected from the group consisting of epoxy resin, melamine resin, oxazoline compound, carbodiimide compound, and isocyanate compound, and at least one resin (C) selected from the group consisting of polyester resin, acrylic resin, and urethane resin. Such a constitution facilitates the production of a resin layer that has a water contact angle of 85° or more and 100° or less, that meets the relation |H2-H1|≤1.0 (%) where H1 (%) represents the haze of the laminated film and H2 (%) represents the haze of the laminated film after solvent immersion and abrasion test, which means a resin layer having a high degree of crosslinking, and that ensures high peelability of the surface layer.

Release Agent (A)

The release agent (A) is a compound added to a coating composition to impart releasability (i.e., the property of decreasing the surface free energy of a resin or decreasing the coefficient of static friction of a resin) to the surface of the resulting coat layer. Useful materials for the release agent (A) include long chain alkyl group-containing resins, olefin resins, fluorine compounds, and wax based compounds. In particular, the use of a long chain alkyl group-containing resin is preferred because high peelability can be developed.

Such long chain alkyl group-containing compounds may be commercially available products, and useful examples include ASHIO REGIN (registered trademark) series (long chain alkyl based compounds, manufactured by Ashio Co., Ltd.), Pyroyl series (long chain alkyl compounds, manufactured by Ipposha Oil Industries Co., Ltd.), and Resem series (aqueous dispersions of long chain alkyl based compounds, manufactured by Chukyo Yushi Co., Ltd.). It is preferable for the release agent (A) to have an alkyl group containing 12 or more carbon atoms, more preferably have an alkyl group containing 16 or more carbon atoms. If it has an alkyl group containing 12 or more carbon atoms, it acts to increase the hydrophobicity and the release agent (A) has an adequately high releasability. If it contains only less than 12 carbon atoms, it may fail to have the effect of enhancing the releasing performance to a sufficient degree. There are no specific limitations on the upper limit on the number of carbon atoms in an alkyl group, but the number is preferably 25 or less to ensure easy production.

Such a resin having an alkyl group containing 12 or more carbon atoms is preferably a resin having a polymethylene backbone chain and an alkyl side chain containing 12 or more carbon atoms. When having a polymethylene backbone chain, the total number of hydrophilic groups in the resin will decrease to allow the release agent (A) to have a larger releasing effect.

Crosslinking Agent (B)

The crosslinking agent (B) may be at least one selected from the group consisting of epoxy resins, melamine resins, oxazoline compounds, carbodiimide compounds, and isocyanate compound. In particular, melamine resins are preferred because they serve efficiently for increasing the degree of crosslinking in the resin layer to allow the surface layer to have small peeling resistance.

Epoxy resins that can be used as the crosslinking agent (B) include, for example, sorbitol polyglycidyl ether based crosslinking agents, polyglycerol polyglycidyl ether based crosslinking agents, diglycerol polyglycidyl ether based crosslinking agents, and polyethylene glycol diglycidyl ether based crosslinking agents. The epoxy resin to be used may be a commercially available product, and examples include DENACOL (registered trademark) EX-611, EX-614, EX-614 B, EX-512, EX-521, EX-421, EX-313, EX-810, EX-830, and EX-850 (epoxy compounds, manufactured by Nagase ChemteX Corporation), SR-EG, SR-8EG, and SR-GLG (diepoxy and polyepoxy based compounds, manufactured by Sakamoto Yakuhin Kogyo Co., Ltd.), and EPICLON (registered trademark) EM-85-75W and CR-5L (epoxy crosslinking agents, manufactured by Dainippon Ink and Chemicals Inc.), of which water-soluble ones are preferred.

Melamine resins that can be used as the crosslinking agent (B) include, for example, melamine, methylolated melamine derivatives produced by condensing melamine and formaldehyde, partially or completely etherified compounds produced by reacting methylolated melamine with lower alcohol, and mixtures thereof. The melamine resin may be condensation products of monomers, dimmers, or higher-mers, or mixtures thereof. Lower alcohols that can be used for etherification include methyl alcohol, ethyl alcohol, isopropyl alcohol, n-butanol, and isobutanol. Usable functional groups contain an imino group, methylol group or alkoxy methyl group such as methoxy methyl group and butoxy methyl group in one molecule, and examples thereof include imino type methylated melamine resin, methylol type melamine resin, methylol type methylated melamine resin, and complete alkyl type methylated melamine resin. Of these, methylolated melamine resin is the most preferred.

It is preferable that an oxazoline compound that can be used as the crosslinking agent (B) has an oxazoline group as a functional group in the compound and preferably incorporates an oxazoline group-containing copolymer that contains at least one monomer with an oxazoline group and produced by copolymerizing it with at least one other monomer.

Examples of such a monomer containing an oxazoline group include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline, which may be used singly or as a mixture of two or more thereof. In particular, 2-isopropenyl-2-oxazoline is preferred because it is high in industrial availability.

For the oxazoline compounds such at least one other monomer used in addition to a monomer containing an oxazoline group is a monomer that is copolymerizable with the monomer containing an oxazoline group, and examples thereof include acrylic esters and methacrylic esters such as methyl acrylate, methyl methacrylate, ethyl acrylate, ethyl methacrylate, butyl acrylate, butyl methacrylate, 2-ethylhexyl acrylate, and 2-ethylhexyl methacrylate; unsaturated carboxylic acids such as acrylic acid, methacrylic acid, itaconic acid, and maleic acid; unsaturated nitriles such as acrylonitrile and methacrylonitrile; unsaturated amides such as acrylamide, methacrylamide, N-methylol acrylamide, and N-methylol methacrylamide; vinyl esters such as vinyl acetate and vinyl propionate; vinyl ethers such as methyl vinyl ether and ethyl vinyl ether; olefins such as ethylene and propylene; halogen-containing α,β-unsaturated monomers such as vinyl chloride, vinylidene chloride, and vinyl fluoride; and α,β-unsaturated aromatic monomers such as styrene and α-methyl styrene, which may be used singly or as a mixture of two or more thereof.

A carbodiimide compound that can be used as the crosslinking agent (B) is a compound containing, as functional groups in the molecule, one or a plurality of carbodiimide groups and cyanamide groups that are tautomeric relation with the former. Specific examples of such carbodiimide compounds include dicyclohexyl methane carbodiimide, dicyclohexyl carbodiimide, tetramethyl xylylene carbodiimide, and urea modified carbodiimide, which may be used singly or as a mixture of two or more thereof.

Isocyanate compounds that can be used as the crosslinking agent (B) include, for example, tolylene diisocyanate, diphenyl methane-4,4'-diisocyanate, meta-xylylene diisocyanate, hexamethylene-1,6-diisocyanate, 1,6-diisocyanate hexane, addition product of tolylene diisocyanate and hexanetriol, addition product of tolylene diisocyanate and trimethylolpropane, polyol modified diphenylmethane-4,4'-diisocyanate, carbodiimide modified diphenylmethane-4,4'-diisocyanate, isophorone diisocyanate, 1,5-naphthalene diisocyanate, 3,3'-bitolylene-4,4' diisocyanate, 3,3'-dimethyldiphenyl ethane-4,4'-diisocyanate, and metaphenylene diisocyanate.

Since isocyanate groups can easily react with water, furthermore, the use of a blocked isocyanate based compound in which the isocyanate group is blocked by a blocking agent is preferred from the viewpoint of the pot life of the coating material. In this example, as the coating composition spread on the polyester film is subsequently dried by heating, the block agent is dissociated easily to expose the isocyanate group, thereby accelerating the crosslinking reaction. The isocyanate group may be either a monofunctional one or a polyfunctional one, but the use of a polyfunctional type blocked polyisocyanate based compound is preferred because the crosslink density in the resin layer can be easily increased to ensure small peeling resistance of the surface layer.

Resin (C)

The resin (C) may be at least one selected from the group consisting of polyester resin, acrylic resin, and urethane resin. It is preferable for the resin (C) to contain functional groups that can act as crosslinking points for the crosslinking agent (B). If such functional groups that can act as crosslinking points are contained, the crosslinking reaction with the crosslinking agent (B) proceeds efficiently to produce a resin layer having an increased degree of crosslinking, thereby easily ensuring small peeling resistance of the surface layer.

The polyester resin to be used as the resin (C) has an ester bond in the backbone chain or a side chain and preferably produced through condensation polymerization of a dicarboxylic acid and a diol.

Dicarboxylic acids that can serve as material for producing the polyester resin include aromatic, aliphatic, and alicyclic dicarboxylic acids. Such aromatic dicarboxylic acids include terephthalic acid, isophthalic acid, orthophthalic acid, phthalic acid, 2,5-dimethyl terephthalic acid, 1,4-naphthalene dicarboxylic acid, biphenyl dicarboxylic acid, 2,6-naphthalene dicarboxylic acid, 1,2-bisphenoxy-ethane-p-p'-dicarboxylic acid, and phenylindane dicarboxylic acid. Such aliphatic and alicyclic dicarboxylic acids include succinic acid, adipic acid, sebacic acid, azelaic acid, dodecanedioic acid, dimer acid, 1,3-cyclopentane dicarboxylic acid, 1,2-cyclohexane dicarboxylic acid, 1,4-cyclohexane dicarboxylic acid, and ester-forming derivatives thereof.

Diol components that can serve as material for producing the polyester resin include ethylene glycol, diethylene glycol, polyethylene glycol, propylene glycol, polypropylene glycol, 1,3-propanediol, 1,3-butanediol, 1,4-butanediol, 1,5-pentanediol, 1,6-hexanediol, 1,7-heptanediol, 1,8-octanediol, 1,9-nonanediol, 1,10-decanediol, 2,4-dimethyl-2-ethylhexane-1,3-diol, neopentyl glycol, 2-ethyl-2-butyl-1,3-propanediol, 2-ethyl-2-isobutyl-1,3-propanediol, 3-methyl-1,5-pentanediol, 2,2,4-trimethyl-1,6-hexanediol, 1,2-cyclohexanedimethanol, 1,3-cyclohexanedimethanol, 1,4-cyclohexanedimethanol, 2,2,4,4-tetramethyl-1,3-cyclobutanediol, 4,4'-thiodiphenol, bisphenol A, 4,4'-methylenediphenol, 4,4'-(2-norbornylidene)diphenol, 4,4'-dihydroxybiphenol, o-, m-, and p-dihydroxybenzene, 4,4'-isopropylidene phenol, 4,4'-isopropylidenebindiol, cyclopentane-1,2-diol, cyclohexane-1,2'-diol, cyclohexane-1,2-diol, and cyclohexane-1,4-diol.

Furthermore, the polyester resin may be a modified polyester copolymer such as, for example, a block copolymer or a graft copolymer modified with an acrylate, urethane, epoxy or the like.

There are no specific limitations on the acrylic resin to be used as the resin (C), but it preferably contains an alkyl methacrylate component and/or an alkyl acrylate component.

Preferred examples of the alkyl methacrylate and/or alkyl acrylate include methacrylic acid, methyl methacrylate, ethyl methacrylate, isopropyl methacrylate, n-butyl methacrylate, isobutyl methacrylate, n-hexyl methacrylate, lauryl methacrylate, 2-hydroxyethyl methacrylate, hydroxypropyl methacrylate, acrylic acid, methyl acrylate, ethyl acrylate, isopropyl acrylate, n-butyl acrylate, isobutyl acrylate, n-hexyl acrylate, lauryl acrylate, 2-ethylhexyl acrylate, 2-hydroxyethyl acrylate, hydroxypropyl acrylate, maleic acid, itaconatic acid, acrylamide, N-methylol acrylamide, and diacetone acrylamide. These may be used singly or as a mixture of two or more thereof.

On the other hand, the useful acrylic resin to be used as the resin (C) preferably has a functional group reactive to the crosslinking agent (B) in the side chain. If it has a reactive side chain, it produces a resin layer having a higher degree of crosslinking, thereby easily ensuring a high peelability of the surface layer. There are no specific limitations on the reactive side chain, but examples thereof include hydroxyl group, carboxyl group, tertiary amino group, quaternary ammonium salt group, sulfonic acid group, and phosphoric acid group. Of these, those containing a (meth)acrylate having a hydroxyl group are particularly preferred from the viewpoint of the dispersion stability of the resulting coating composition. Preferred (meth)acrylates having hydroxyl groups include those produced by monoesterification of polyhydric alcohol and (meth)acrylic acid such as 2-hydroxyethyl (meth)acrylate, 2-hydroxypropyl (meth)acrylate, 2,3-dihydroxybutyl (meth)acrylate, 4-hydroxybutyl (meth) acrylate, and polyethylene glycol mono(meth)acrylate; and compounds produced by ring opening polymerization of such a monoesterification product and ε-caprolactone, of which 2-hydroxyethyl (meth)acrylate and 2-hydroxypropyl (meth)acrylate are particularly preferred.

When the resin (C) contains a (meth)acrylate having a hydroxyl group, it preferably accounts for 0.5 wt % or more and 10 wt % or less, more preferably 1 wt % or more and 5 wt % or less, relative to the overall quantity of the resin (C). If the content of the (meth)acrylate having a hydroxyl group is in the above range, the resulting resin layer will have a higher degree of crosslinking, thereby easily having the effect of realizing a high peelability of the surface layer.

The urethane resin to be used as the resin (C) is preferably a resin that is produced by reacting a polyhydroxy compound with a polyisocyanate compound by a generally known urethane resin polymerization method such as emulsion polymerization and suspension polymerization.

Examples of such a polyhydroxy compound include polyethylene glycol, polypropylene glycol, polyethylene-propylene glycol, polytetramethylene glycol, hexamethylene glycol, tetramethylene glycol, 1,5-pentanediol, diethylene glycol, triethylene glycol, polycaprolactone, polyhexamethylene adipate, polyhexamethylene sebacate, polytetramethylene adipate, polytetramethylene sebacate, trimethylol propane, trimethylol ethane, pentaerythritol, polycarbonate diol, and glycerin.

Examples of such a polyisocyanate compound include hexamethylene diisocyanate, diphenylmethane diisocyanate, tolylene diisocyanate, isophorone diisocyanate, addition product of tolylene diisocyanate and trimethylene propane, and addition product of hexamethylene diisocyanate and trimethylol ethane.

The resin layer in the laminated film may further contain a crosslinking catalyst (D). If such a crosslinking catalyst (D) is contained, it works to realize an efficient crosslinking reaction between the crosslinking agent (B) and the resin (C) during heat treatment to achieve an increased degree of crosslinking and, as a result, the penetration of the surface layer into the resin layer is prevented more strongly during the coating of the resin layer with the surface layer, thereby easily ensuring high peelability of the surface layer. Useful materials as the crosslinking catalyst (D) include, for example, acidic catalysts such as p-toluene sulfonic acid, and amine salt based catalysts.

It is preferable for the resin layer in the laminated film to be formed from a coating composition containing a release agent (A), at least one crosslinking agent (B) selected from the group consisting of epoxy resin, melamine resin, oxazoline compound, carbodiimide compound, and isocyanate compound, and at least one resin (C) selected from the group consisting of polyester resin, acrylic resin, and urethane resin, and the release agent (A) in the coating composition preferably accounts for 5 to 50 parts by mass relative to the total amount of the crosslinking agent (B) and the resin (C), which accounts for 100 parts by mass. It is more preferably 10 to 30 part by mass. If the release agent (A) accounts for 5 parts or more, it serves to impart a sufficiently high peelability to the resin layer. If the release agent (A) accounts for 50 parts by mass or less, furthermore, not only it is easy to allow the resin layer to have a water contact angle of 100° or less and the occurrence of defects such as cissing and pinholes can be prevented during the formation of the surface layer by coating, but also the contents of the crosslinking agent (B) and resin (C) in the coating composition will be sufficiently large, resulting in a higher degree of crosslinking in the resin layer and, in particular, a higher peelability of the surface layer.

For the coating composition used to form the resin layer in the laminated film, the mass ratio between the crosslinking agent (B) and the resin (C) is preferably 5/95 to 50/50. It is more preferably 10/90 to 30/70. If it is in this range, the crosslinking points of the resin (C) and the crosslinking agent (B) undergo a crosslinking reaction to a sufficient degree, thereby resulting in a higher degree of crosslinking in the resin layer and, in particular, a high peelability of the surface layer.

In addition, it is preferable for the coating composition to further contain a compound (X) having a structure as represented by formula (1) below. The release agent (A) is highly hydrophobic and tends to coagulate easily, but its combined use with a compound (X) that has a structure as represented by formula (1) serves to depress coagulation of the release agent (A) and decrease the amount of coagulation products in the resin layer, thereby allowing the resin layer to have an increased surface smoothness.

(1)

wherein n is an integer of 3 or greater.

For the coating composition, furthermore, the incorporation of a compound (X) having a structure as represented by formula (1) increases the compatibility among the release agent (A), the crosslinking agent (B), and the resin (C). The distribution of various components in the resin layer can be controlled and it will be easy to decrease the value of |H2-H1|, thereby enabling the production of a resin layer that ensures a high peelability of the surface layer.

Examples of a compound (X) having a structure as represented by formula (1) include polyoxy ethylene-polyoxy propylene block copolymer and polyethylene glycol. It may be good to use a commercially available one, and useful examples include Pluronic(R) PE3100, PE3500, PE4300, PE6100, PE6120, PE6200, PE6400, PE6800, PE7400, PE8100, PE9200, PE9400, PE10100, PE10300, PE10400, and PE10500 (all manufactured by BASF Japan), Adeka(R) Pluronic L-23, L-31, L-33, L-34, L-35, F-38, L-42, L-43, L-44, L-61, L-62, L-64, P-65, F-68, L-71, L-72, P-75, P-77, L-81, P-84, P-85, F-88, L-92, P-94, F-98, L-101, P-103, P-104, P-105, F-108, L-121, L-122, P-123, and F-127 (all manufactured by Adeka Corporation), and Newpol PE-34, PE-61, PE-62, PE-64, PE-68, PE-71, PE-74, PE-75, PE-78, PE-108, and PE-128 (all manufactured by Sanyo Chemical Industries Ltd.).

Whether a coating composition contains a compound (X) having a structure as represented by formula (1) can be determined by time-of-flight secondary ion mass spectrometry (GCIB-TOF-SIMS) performed under the measuring conditions described later.

It is preferable for the compound (X) to have a weight average molecular weight of 1,000 or more and 20,000 or less. It is more preferably 2,000 or more and 16,000 or less, still more preferably 6,000 or more and 16,000 or less, and particularly preferably 11,000 or more and 16,000 or less. If the weight average molecular weight is 1,000 or more, it works to increase the dispersion stability of the release agent (A) to allow the resin layer to have a sufficiently high surface smoothness while preventing the compound (X) from being transferred to the surface layer, which is formed of ceramic slurry in most instances. If the weight average molecular weight is 20,000 or less, on the other hand, it will be easy to allow the resin layer to have a water contact angle of 85° or more while realizing a high degree of crosslinking in the resin layer, thereby leading to a high peelability of the surface layer, which is formed of ceramic slurry in most instances. Compared to this, if the weight average molecular weight is less than 1,000, the dispersion stability of the release agent (A) will not be increased sufficiently and coagulation products will be formed, possibly failing to maintain a required surface smoothness or causing the transfer of the compound (X) to the surface layer, which is formed of ceramic slurry in most instances. On the contrary, if the weight average molecular weight is more than 20,000, the resin layer may fail to have a water contact angle of 85° or more or have a sufficiently high degree of crosslinking, possibly resulting in a surface layer, which is formed of ceramic slurry in most instances, that has a large peeling resistance.

The weight average molecular weight of the compound (X) contained in the coating composition is determined by gel permeation chromatography (GPC) performed by the procedure described later. Specifically, it is determined as the weight average molecular weight of a reference polymethyl methacrylate under the measuring conditions below.

Apparatus: GPC apparatus (HLC-8220) manufactured by Tosoh Corporation
Column: TSK GEL SuperH1000, TSK GEL SuperH2000, TSK GEL SuperH3000 (all
manufactured by Tosoh Corporation)
Solvent: water/ethanol
Flow rate: 0.5 mL/min
Specimen concentration: 1 mg/mL
Injection rate: 0.1 mL It is preferable for the compound (X) to account for 15 parts by mass or more and 100 parts by mass or less relative to the quantity of the release agent (A), which is assumed to account for 100 parts by mass. The content is more preferably 30 parts by mass or more and 90 parts by mass or less, still more preferably 45 parts by mass or more and 80 parts by mass or less. If the compound (X) accounts for 15 parts by mass or more relative to 100 parts by mass of the release agent (A), it works to increase the dispersion stability of the release agent (A), thereby allowing the resin layer to have a sufficiently high surface smoothness and realizing narrow distributions of elastic modulus and constituent components in the resin layer. If the content of the compound (X) is 100 or parts by mass or less, on the other hand, it will be easy to allow the resin layer to have a water contact angle of 85° or more while realizing a high degree of crosslinking in the resin layer, thereby leading to a high peelability of the surface layer, which is formed of ceramic slurry in most instances.

If it is less than 15 parts by mass, the dispersion stability of the release agent (A) will not be increased sufficiently and coagulation products will be formed, possibly failing to maintain a required surface smoothness or causing the transfer of the compound (X) to the surface layer, which is formed of ceramic slurry in most instances. On the other hand, if it is more than 100 parts by mass, the resin layer may fail to have a water contact angle of 85° or more or have a sufficiently high degree of crosslinking, possibly resulting in a surface layer, which is formed of ceramic slurry in most instances, that has a large peeling resistance.

Ceramic Slurry

A particularly preferred use of the laminated film is the process film for a process in which the surface of a resin layer is coated with a ceramic slurry and the ceramic slurry is then solidified, followed by peeling the solidified film. The ceramic slurry is a mixture of a ceramic material, binder resin, and solvent.

There are no specific limitations on the ceramic material to be used to form a ceramic slurry, and a variety of dielectric materials can be used. Examples include oxides of metals such as titanium, aluminum, barium, lead, zirconium, silicon, and yttrium, as well as barium titanate, $Pb(Mg_{1/3}, Nb_{2/3})O_3$, $Pb(Sm_{1/2},Nb_{1/2})O_3$, $Pb(Zn_{1/3},Nb_{2/3})O_3$, $PbThO_3$, and $PbZrO_3$. These may be used singly or as a combination of two or more thereof.

Useful binder resins for forming ceramic slurry include polymers such as polyurethane resin, urea resin, melamine resin, epoxy resin, vinyl acetate resin, acrylic resin, polyvinyl alcohol, and polyvinyl butyral. These may be used singly or as a combination of two or more thereof.

The solvent used in the ceramic slurry may be either water or an organic solvent. When an organic solvent is to be used, useful examples include toluene, ethanol, methyl ethyl ketone, isopropyl alcohol, and γ-butyl lactone. These may be used singly or as a combination of two or more thereof. In addition, the ceramic slurry may contain a plasticizer, dispersing agent, antistatic agent, surface active agent or the like as required.

Furthermore, the laminated film can be particularly useful when the ceramic slurry contains ferrite. Preferred ferrite materials include those containing heavy metals such as copper, zinc, nickel, and manganese and those containing light metals such as alkali metals and alkaline earth metals. Since ferrite-containing ceramic slurry is characterized by a large surface tension compared to ferrite-free ceramic slurry, coating defects such as cissing and pinholes can occur when it is spread on a resin layer having conventional release properties. The resin layer in the laminated film not only ensures a high peelability in removing a surface layer, but also has a water contact angle of 100° or less, which means a high spreadability in forming a surface layer, and this is preferred because generation of defects such as cissing and pinholes can be suppressed even when it is coated with a ferrite-containing ceramic slurry to form a surface layer.

Production Method

Formation of a resin layer on at least one surface of a polyester film can be achieved by either in-line coating or off-line coating, of which in-line coating is preferred. In-line coating is a coating technique that is performed in the course of the process for polyester film production. Specifically, coating is performed at any step in the process in which a polyester resin is melt-extruded, biaxially stretched, heat-treated, and wound up, and commonly, a coating composition is spread on any of the following: the substantially amorphous unstretched (unoriented) polyester film resulting from melt extrusion and subsequent quenching (film A), uniaxially stretched (uniaxially oriented) polyester film resulting from subsequent stretching in the length direction (film B), and biaxially stretched (biaxially orientated) polyester film resulting from further stretching in the width direction but not heat-treated yet (film C).

For off-line coating, on the other hand, the film A described above is stretched uniaxially or biaxially and then heat-treated to complete crystal orientation in the polyester film, followed by spreading a resin composition, or the coating of the film A is performed in a separate step from the film production process.

It is preferable to adopt an in-line coating technique to produce a laminated film. If an in-line coating technique is adopted for the production, not only a laminated film can be produced at lower cost compared to, for example, resin layer formation on a biaxially stretched PET film by off-line coating, but also high temperature heat treatment at 200° C. or more, which is substantially impossible by off-line coating, can be performed to promote the crosslinking in the resin layer to realize a smaller slurry peeling resistance. In particular, it is preferable for the laminated film to be produced by a production method that includes a step of spreading a coating composition containing a release agent (A) on at least one surface of a polyester film in which crystal orientation has not been completed, a subsequent step of stretching it at least uniaxially, and a subsequent step of heat-treating it to complete the crystal orientation in the polyester film.

Coating Method

To coat a polyester film with a resin composition, a generally known coating method such as, for example, bar coating, reverse coating, gravure coating, die coating, and blade coating may be adopted appropriately.

Described here is the adhesion between a polyester film and a resin layer.

If a resin layer is formed on a polyester film by a conventional off-line coating technique, the resulting resin layer is so low in surface energy that its adhesion with the film is weak and, as a result, the resin layer may be abraded if, for example, rewinding of the film roll is performed, possibly leading to the problem of deterioration in peelability. However, if a resin layer is formed by an in-line coating technique, the coating composition is spread on the polyester film before the completion of crystal orientation and this allows a very small amount of the coating composition to penetrate into the polyester film, thereby serving to develop strong adhesion between the resin layer and the thermoplastic resin film. As a result, a favorable peelability can be maintained. Method of forming resin layer It is preferable to form a resin layer by spreading a coating composition on at least one surface of a polyester film, followed by drying. If a solvent is added to the coating composition, the solvent to be used is preferably an aqueous solvent. The use of an aqueous solvent serves to depress rapid evaporation of the solvent during the drying step, serving not only to form a uniform resin layer, but also to prevent environment loads from being caused.

The aqueous solvent is water or a mixture of water and a water-soluble organic solvent such as alcohol (methanol, ethanol, isopropyl alcohol, butanol or the like), ketone (acetone, methyl ethyl ketone or the like), glycol (ethylene glycol, diethylene glycol, propylene glycol or the like), mixed at appropriate ratios.

As described above, it is preferable to adopt an in-line coating technique to spread a coating composition on a film. Specifically, coating is performed at any step in the process in which a polyester resin is melt-extruded, biaxially stretched, heat-treated, and wound up, and commonly, a coating composition is spread on any of the following: the substantially amorphous unstretched (unoriented) film resulting from melt extrusion and subsequent quenching (film A), uniaxially stretched (uniaxially oriented) film resulting from subsequent stretching in the length direction (film B), and biaxially stretched (biaxially orientated) film resulting from further stretching in the width direction but not heat-treated yet (film C).

It is preferable to adopt a method in which the coating composition is spread on either film A or film B described above, in which crystal orientation has not completed, followed by stretching the film uniaxially or biaxially, and heat-treating it at a temperature higher than the boiling point of the solvent to complete the crystal orientation in the film and simultaneously form the resin layer. This method allows production of a film and the spreading and drying of a coating composition (that is, formation of a resin layer) to be performed simultaneously to ensure advantages in terms of production cost.

In particular, the best way is to spread the coating composition on a film uniaxially stretched in the length direction (film B), stretch it in the width direction, and then heat-treat it. This is because compared to the method involving biaxial stretching after coating an unstretched film, only one stretching step is required and accordingly, the resin layer will suffer less numbers of defects and cracks attributable to stretching. Thus, the resulting resin layer will be high in smoothness. In addition, as described above, the coating composition is spread on the film before the completion of crystal orientation and this develops strong adhesion between the resin layer and the polyester film.

To form the resin layer, therefore, it is preferable that a coating composition containing an aqueous solvent is spread on a polyester film by an in-line coating technique, followed by drying and heat treatment. More preferably, a coating composition is spread on film B, i.e. a uniaxially stretched film, by in-line coating. For the production method of the laminated film, the drying step, which is intended to complete the removal of the solvent from the coating composition, can be performed at a temperature of 80° C. to 130° C. Furthermore, not only to complete the crystal orientation in the polyester film, but also to complete the heat curing of the coating composition to realize complete formation of a resin layer, the heat treatment step can be performed at a temperature of 160° C. to 240° C.

In addition, it is preferable for the solid content in the coating composition to be 40 mass % or less. A solid content of 40 mass % or less allows the coating composition to be spread favorably, making it possible to produce a laminated film having a uniform resin layer.

The solid content means the proportion calculated by subtracting the mass of the solvent from the mass of the coating composition and dividing the difference by the mass of the coating composition (that is, [solid content]=[(mass of coating composition)−(mass of solvent)]/[mass of coating composition]).

Production Method of Laminated Film

Next, the production method of the laminated film is described below. Although polyethylene terephthalate films are used as polyester films in the examples below, this disclosure is not limited thereto.

First, pellets of polyethylene terephthalate (hereinafter abbreviated as PET) are vacuum-dried adequately, supplied to an extruder, melt-extruded at about 280° C. into a sheet, and cooled for solidification to prepare an unstretched (unoriented) PET film (film A). This film is stretched 2.5 to 5.0 times in the length direction by rolls heated at 80° C. to 120° C. to provide a uniaxially oriented PET film (film B). A release agent adjusted to an appropriate concentration is spread on one surface of this film B. In this step, the surface of the PET film to be coated may be subjected to surface treatment such as corona discharge treatment before coating. The implementation of surface treatment such as corona discharge treatment can improve the wettability of the PET film by the coating composition and prevent cissing of the coating composition to ensure a uniform coating thickness.

After the coating step, the PET film, with its ends clipped, is introduced into a heat treatment zone (preheat zone) adjusted to 80° C. to 130° C. to remove the solvent from the coating composition. After this drying step, it is stretched 1.1 to 5.0 times in the width direction. Subsequently, it is introduced into another heating zone (heat treatment zone) adjusted to 150° C. to 250° C. where it is heat-treated for 1 to 30 seconds to complete crystal orientation and formation of a resin layer. We believe that this heating step (heat treatment step) promotes crosslinking in the resin layer. In this heating step (heat treatment step), the film may be relaxed by 3% to 15% in the width direction or in the length direction as required.

Methods of Measuring Characteristics and Methods of Evaluating Effects

The methods of measuring characteristics and methods of evaluating effects used herein are as described below.

(1) Haze

Using a direct reading type haze meter manufactured by Toyo Seiki Co., Ltd., the haze (%) at 23° C. of a laminated film was measured three times and the average H1 (%) was calculated. In addition, after performing solvent immersion and abrasion test under the conditions described below, the haze (%) at 23° C. of the laminated film was measured three times and the average H2 (%) was calculated.

Solvent Immersion and Abrasion Test

After immersing the laminated film in methyl ethyl ketone for 10 minutes, a piece of cotton cloth (Haize Gauze NT-4, manufactured by Ozu Corporation) was moved back and forth ten times under a load of 1 kg to abrade the surface of the resin layer using a Gakushin type rubbing tester (manufactured by Daiei Kagaku Seiki Mfg. Co., Ltd.).

(2) Analysis Method for Surface Components of Resin Layer

Using GCIB-TOF-SIMS (GCM: gas cluster ion beam, TOF-SIMS: time-of-flight secondary ion mass spectrometry), components existing in the surface of the resin layer in the laminated film were analyzed. The measuring conditions used were as described below.

Sputtering Conditions
Ion source: argon gas cluster ion beam
Detection conditions
Primary ion: $Bi^{3++}$ (25 keV)
Secondary ion polarity: negative
Mass range: m/z 0 to 1,000
Measuring range: 200×200 μm$^2$ The P/K ratio was calculated where K represents the peak intensity attributed to the fragment detected with the maximum strength and P represents the peak intensity of the fragment attributed to dimethyl siloxane ($SiCH_3^+$ fragment ion (M/Z=43)). It is assumed that the resin layer is substantially free of silicone compounds if P/K<0.01.

On the other hand, it is assumed that the resin layer contains a compound (X) having a structure as represented by formula (1) if Q/K ≥0.02 where Q is the peak intensity of a fragment attributed to repetition of a structure as represented by formula (1), that is, (—$CH_2$—$CH_2$—O—$CH_2$—$CH_2$—O—$CH_2$—$CH_2$—O—)$^+$—(M/Z =132)).

(3) Calculation Methods for Water Contact Angle and Surface Energy

First, the laminated film is left to stand for 24 hours in an atmosphere at room temperature (23° C.) and a relative humidity of 65%. Then, in the same atmosphere, the contact angles of four solutions, i.e. pure water, ethylene glycol, formamide, and diiodomethane, on the surface of the resin layer in the laminated film were measured separately at five points using a CA-D type contact angle meter (manufactured by Kyowa Interface Science Co., Ltd.). Of the five measurements, the maximum and minimum are omitted and the remaining three measurements are averaged to represent the contact angle of each solution.

Subsequently, using the contact angles of the four solutions determined above, the dispersion force, polar force, hydrogen bonding strength, and surface energy, which is the sum of the dispersion force and the polar force, are calculated by the geometrical average method based on "an extended form of the Fowkes equation (extended Fowkes equation) that involves three components, namely the dispersion force component ($\gamma_S^d$), polar force component ($\gamma_S^p$), and hydrogen bonding strength component ($\gamma_S^h$), of the surface free energy (γ) of a solid", which is proposed by Hata et al.

A detailed procedure for the calculation is described below. The meanings of the symbols are as follows. Equation (A) holds when $\gamma_S^L$ represents the tension at a solid-liquid interface.

$\gamma_S^L$: surface energy of the resin layer and a known solution given in the Tables
$\gamma_S$: surface energy of the resin layer
$\gamma_L$: surface energy of a known solution given in the Tables
$\gamma_S^d$: dispersion force component of surface energy of the resin layer
$\gamma_S^p$: polar force component of surface energy of the resin layer
$\gamma_S^h$: hydrogen bond strength component of surface energy of the resin layer
$\gamma_L^d$: dispersion force component of surface energy of a known solution given in the Tables
$\gamma_L^p$: polar force component of surface energy of a known solution given in the Tables
$\gamma_L^h$: hydrogen bond strength component of surface energy of a known solution given in the Tables $$\gamma_S^L = \gamma_S + \gamma_L - 2(\gamma_S^d \cdot \gamma_L^d)^{1/2} - 2(\gamma_S^p \cdot \gamma_L^p)^{1/2} - 2(\gamma_S^h \cdot \gamma_L^h)^{1/2} \quad (A)$$

Meanwhile, the state in which a smooth solid surface and a droplet is in contact with a contact angle (θ) is represented by equation (B) below (Young's formula).

$$\gamma_S = \gamma_S^L + \gamma_L \cos\theta \quad (B)$$

Combination of equations (A) and (B) gives equation (C) below.

$$(\gamma_S^d \cdot \gamma_L^d)^{1/2} + (\gamma_S^p \cdot \gamma_L^p)^{1/2} + (\gamma_S^h \cdot \gamma_L^h)^{1/2} = \gamma_L(1+\cos\theta)/2 \quad (C)$$

Actually, the contact angles (θ) of the four solutions of water, ethylene glycol, formamide, and diiodomethane and the components ($\gamma_L^d$, $\gamma_L^p$, $\gamma_L^h$) of the surface tension of a known solution are substituted in equation (C), and the resulting four simultaneous equations are solved. As a result, the surface energy (γ), dispersion force component ($\gamma_S^d$), polar force component ($\gamma_S^p$), and hydrogen bonding strength component ($\gamma_S^h$) of the solid are calculated.

(4) Slurry Peeling Resistance

To determine the slurry peeling resistance, a ceramic slurry prepared by mixing the undermentioned components was spread on the resin layer in the laminated film using an applicator so that the final thickness would be 3 μm and then dried in a hot air oven at 100° C. for 3 minutes to form a ceramic sheet. The ceramic sheet was subjected to 180° peeling test at a peeling rate of 300 mm/min using a universal tester (Autograph AG-1S, manufactured by Shimadzu Corporation) and a 50 N load cell. Measurements were used to develop a peeling resistance (N)—test time (sec) curve, from which the averaged peeling resistance over the period from 5 to 10 seconds was calculated. This measuring run was performed five times and, after omitting the maximum and minimum, the remaining three measurements were averaged to represent the resistance to peeling from the laminated film, followed by making an evaluation as follows. Test samples ranked as A or higher were judged to be good and those ranked as B were judged to be practically acceptable.

S: less than 20 mN/cm
A: 20 mN/cm or more and less than 40 mN/cm
B: 40 mN/cm or more and less than 80 mN/cm
C: 80 mN/cm or more Components of ceramic slurry
$BaTiO_3$ (manufactured by Sakai Chemical Industry Co., Ltd.) 85 parts by mass
polyvinyl butyral (S-LEC (registered trademark) BM-2, manufactured by Sekisui Chemical Co., Ltd.) 15 parts by mass
dioctyl phthalate (manufactured by Kanto Chemical Co., Inc.) 5 parts by mass
toluene 150 parts by mass
ethanol (manufactured by Tokyo Chemical Industry Co. Ltd.) 150 parts by mass.

(5) Thickness of Resin Layer

The laminated film was dyed with $RuO_4$ and/or $OsO_4$. Then, the laminated film was frozen and cut in the film thickness direction to prepare ten ultrathin section samples for observation of cross sections of the resin layer. Each cross-sectional sample was observed by TEM (transmission electron microscope, H7100FA, manufactured by Hitachi, Ltd.) at a magnification of 10,000 to 1,000,000 to provide a cross-sectional photograph. The thickness measurements taken from ten resin layer samples were averaged to represent the thickness of the resin layer in the laminated film.

(6) Slurry Spreadability

A ceramic slurry prepared by mixing the components specified in the section "(4) Slurry peeling resistance" was spread on the resin layer in the laminated film using an applicator so that the final thickness would be 3 µm, 1 µm, or 300 nm, and then dried in a hot air oven at 100° C. for 3 minutes to form ceramic sheets. The ceramic sheets were examined by visual observation to see if they suffered cissing. In general, ceramic slurry with a smaller coating thickness suffers more serious cissing.

S: Cissing is not found in any of the samples with different coating thicknesses.
A: Cissing is not found in the samples with coating thickness of 3 µm or 1 but cissing was found in the sample with coating thickness of 300 nm.
B: Cissing is not found in the sample with coating thickness of 3 µm, but cissing was found in the samples with coating thickness of 1 µm or 300 nm.
C: Cissing is found in all samples with different coating thicknesses.

Test samples ranked as A or higher were judged to be good in terms of slurry spreadability and those ranked as B were judged to be practically acceptable.

(7) Phase Separability in Surface Layer

First, a ceramic slurry prepared by mixing the components specified in the section "(4) Slurry peeling resistance" was spread on the resin layer in the laminated film using an applicator so that final thickness would be 3 and then dried in a hot air oven at 100° C. for 3 minutes to form a ceramic sheet. Then, using a universal tester (Autograph AG-1S, manufactured by Shimadzu Corporation), the ceramic sheet was peeled from the resin layer in the laminated film at a peeling rate of 300 mm/min and a peeling angle of 180°. The peeled ceramic slurry was examined by the measuring methods specified in the section "(3) Calculation methods for water contact angle and surface energy" to determine the water contact angle $\theta 1$ on the surface previously in contact with the resin layer and the water contact angle $\theta 2$ on the surface previously not in contact with the resin layer, followed by making evaluations as described below on the basis of the values of $\theta 2-\theta 1$. The polyvinyl butyral, which acts as the binder component in the ceramic slurry, is more hydrophilic, that is, smaller in water contact angle, than the other components of the ceramic slurry. Accordingly, with an increasing value of $\theta 2-\theta 1$, the binder component in the surface layer is localized nearer to the resin layer in the laminated film, leading to a higher degree of phase separation in the surface layer.

S: $6° \leq \theta 2-\theta 1$
A: $4° \leq \theta 2-\theta 1 < 6°$
B: $2° \leq \theta 2-\theta 1 < 4°$
C: $\theta 2-\theta 1 < 2°$ Test samples ranked as A or higher were judged to be good in terms of phase separability in the surface layer and those ranked as B were judged to be practically acceptable.

(8) Resistance to Transfer

The resistance to transfer was evaluated on the basis of the value calculated as: peeling resistance of once pressure-bonded and peeled pressure sensitive adhesive tape (P1)/initial pressure sensitive adhesive tape peeling resistance (P0)×100. The method of measuring each peeling resistance is described below.

(8-1) Initial Pressure Sensitive Adhesive Tape Peeling Resistance (P0)

A piece of pressure sensitive adhesive tape (polyester tape No. 31B, manufactured by Nitto Denko Corporation, width 19 mm) was pressure-bonded to a stainless steel plate (SUS304) by moving a 5 kg rubber roller back and forth once and left to stand in an environment at 23° C./65% RH for 24 hours, followed by 180° peeling test at a peeling rate of 300 mm/min using a universal tester (Autograph AG-1S, manufactured by Shimadzu Corporation) and a 50 N load cell. Measurements were used to develop a peeling resistance (N)-test time (sec) curve, from which the averaged peeling resistance over the period from 5 to 10 seconds was calculated. This measuring run was performed five times and, after omitting the maximum and minimum, the remaining three measurements were averaged to represent the initial pressure sensitive adhesive tape peeling resistance (P0).

(8-2) Peeling Resistance of Once Pressure-Bonded and Peeled Pressure Sensitive Adhesive Tape (P1)

A piece of pressure sensitive adhesive tape (polyester tape No. 31B, manufactured by Nitto Denko Corporation, width 19 mm) was pressure-bonded to the resin layer in the laminated film by moving a 5 kg rubber roller back and forth once and left to stand in an environment at 23° C./65% RH for 24 hours, followed by 180° peeling test to peel off the pressure sensitive adhesive tape at a peeling rate of 300 mm/min using a universal tester (Autograph AG-1S, manufactured by Shimadzu Corporation) and a 50 N load cell. Then, the peeled pressure sensitive adhesive tape was pressure-bonded to a stainless steel plate (SUS304) and left to stand in an environment at 23° C./65% RH for 24 hours, followed by 180° peeling test at a peeling rate of 300 mm/min using a universal tester (Autograph AG-1S, manufactured by Shimadzu Corporation) and a 50 N load cell. Measurements were used to develop a peeling resistance (N)-test time (sec) curve, from which the averaged peeling resistance over the period from 5 to 10 seconds was calculated. This measuring run was performed five times and, after omitting the maximum and minimum, the remaining three measurements were averaged to represent the initial pressure sensitive adhesive tape peeling resistance (P1).

Using the peeling resistance measurements taken in (8-1) and (8-2), the formula "once pressure-bonded and peeled pressure sensitive adhesive tape peeling resistance (P1)/initial pressure sensitive adhesive tape peeling resistance (P0)×100" is calculated and used to evaluate the resistance to transfer. Test samples ranked as A or higher were judged to be good and those ranked as B were judged to be practically acceptable.

S: 95% or more
A: 90% or more and less than 95%
B: 85% or more and less than 90%
C: less than 85%

(9) Surface Smoothness

The surface of the resin layer in the laminated film was observed by a three dimensional roughness meter to count the number of foreign objects having a size of 0.1 mm or more. It was divided by the area (m$^2$) of the film to calculate the number of foreign objects per square meter of the film. Test samples ranked as A or higher were judged to be good in terms of surface smoothness and those ranked as B were judged to be practically acceptable.

S: 0 to 4 per m$^2$
A: 5 to 19 per m$^2$
B: 20 to 49 per m$^2$
C: 50 or more per m$^2$

EXAMPLES

Our laminated film will now be illustrated in detail with reference to Examples, but this disclosure should not be construed as being limited thereto.

Example 1

Release agent (A): long chain alkyl group-containing resin (a-1)

In a four-necked flask, 200 parts of xylene and 600 parts of octadecyl isocyanate were added and heated while stirring. Immediately after the start of reflux of xylene, 100 parts of polyvinyl alcohol having an average polymerization degree of 500 and a saponification degree of 88 mol % was added in small amounts at intervals of 10 minutes over a period of about 2 hours. After completing the addition of polyvinyl alcohol, reflux was continued for additional 2 hours to complete the reaction. The reaction mixture was cooled to about 80° C. and put in methanol, which resulted in separation of the reaction product in the form of a white precipitate. This precipitate was separated out by filtration, followed by adding 140 parts of xylene, heating to ensure complete dissolution, and adding methanol again to perform precipitation. After repeating this procedure several times, the precipitate was washed with methanol, dried, and crushed to provide a long chain alkyl group-containing resin (a-1: having a polymethylene backbone and a side chain having an alkyl group containing 18 carbon atoms). Its concentration was adjusted to 20 mass % by dilution with water.

Crosslinking Agent (B): Melamine Resin (b-1: Methylolated Melamine)

NIKALAC (registered trademark) MW-035 (manufactured by Sanwa Chemical Co., Ltd., solid content 70 mass %, water as solvent) was used.

Resin (C): Acrylic Resin (c-1)

In a stainless steel reaction container, methyl methacrylate (α), hydroxyethyl methacrylate ((β), urethane acrylate oligomer (ARTRESIN (registered trademark) UN-3320HA, manufactured by Negami Kogyo Co., Ltd., six acryloyl groups) (γ) were fed at a (α)/((β)/(γ) ratio of 94/1/5 by mass, and sodium dodecylbenzenesulfonate was added as emulsifier to 2 parts by mass relative to the total of (α) to (γ), which accounted for 100 parts by mass, followed by stirring to prepare a liquid mixture 1. Next, a reactor equipped with a stirrer, reflux cooling pipe, thermometer, and dropping funnel was set up. Then, 60 parts by mass of the liquid mixture 1, 200 parts by mass of isopropyl alcohol, and 5 parts by mass of potassium persulfate as polymerization initiator were fed in the reactor and heated to 60° C. to prepare a liquid mixture 2. The liquid mixture 2 was maintained in a heated state at 60° C. for 20 minutes. Next, 40 parts by mass of the liquid mixture 1, 50 parts by mass of isopropyl alcohol, and 5 parts by mass of potassium persulfate were mixed to prepare a liquid mixture 3. Then, using a dropping funnel, the liquid mixture 3 was dropped in the liquid mixture 2 over 2 hours to prepare a liquid mixture 4. Subsequently, the liquid mixture 4 was maintained in a heated state at 60° C. for 2 hours. The resulting liquid mixture 4 was cooled to below 50° C. and poured in a container equipped with a stirrer and decompression device. Then, 60 parts by mass of 25% aqueous ammonia and 900 parts by mass of pure water were added, followed by collecting isopropyl alcohol and the unreacted monomers while heating at 60° C. under reduced pressure to obtain an acrylic resin (c-1) dispersed in pure water.

Coating Composition:

The release agent (A), crosslinking agent (B), and resin (C) were mixed such that the solid content ratio of (A)/(B)/(C) was 20/20/80 by mass. In addition, a fluorochemical surface active agent (Plascoat RY-2, manufactured by Goo Chemical Co., Ltd.) was added such that it accounted for 0.1 part by mass relative to the total amount of the coating composition, which accounted for 100 parts by mass, to ensure good coating of a polyester film.

Polyester Film:

PET pellets (limiting viscosity of 0.64 dl/g) containing two types of particles (4 mass % of silica particles with a primary particle diameter of 0.3 μm and 2 mass % of calcium carbonate particles with a primary particle diameter of 0.8 μm) were vacuum-dried sufficiently, supplied to an extruder, melted at 280° C., and extruded through a T-form nozzle to produce a sheet, which was cooled for solidification by bringing it into contact, by the electrostatic casting technique, with a mirror-finished casting drum with a surface temperature 25° C. The resulting unstretched film was heated up to 90° C. and stretched 3.1 times in the length direction to provide a uniaxially stretched film (film B).

Laminated Film

The uniaxially stretched film was subjected to corona discharge treatment in air and a coating composition specified in Tables 1, 2 and 3 was spread on a coating thickness of about 6 μm using a bar coater. Then, the uniaxially stretched film coated with a coating composition, with the width-directional ends held by clips, was introduced into the preheating zone. In the preheat zone, which had an atmospheric temperature adjusted to 90° C. to 100° C., the solvent was removed from the coating composition. Subsequently, it was consecutively stretched 3.6 times in the width direction in the stretching zone at 100° C. and heat-treated for 20 seconds in the heat treatment zone at 240° C. to form a resin layer, followed by 5% relaxation treatment in the width direction at the same temperature to provide a laminated film containing a completely crystal-oriented polyester film. In the resulting laminated film, the PET film had a thickness of 50 μm and the resin layer had a thickness of 60 nm.

Characteristics of the resulting laminated film are shown in Tables 1, 2 and 3. The ceramic slurry was high in both spreadability and peelability.

Example 2

Except for using the undermentioned melamine crosslinking catalyst (d-1) as the catalyst (D), the same procedure as in Example 1 was carried out to provide a laminated film. Characteristics of the resulting laminated film are shown in Tables 1, 2 and 3. The ceramic slurry was high in both spreadability and peelability.

Melamine Crosslinking Catalyst (d-1): Catalyst PTS, Manufactured by DIC Corporation

Examples 3 and 4

Except for mixing the release agent (A), crosslinking agent (B), and resin (C) at a mass ratio as specified in Table 1, the same procedure as in Example 1 was carried out to provide a laminated film. Characteristics of the resulting laminated film are shown in Tables 1, 2 and 3. The ceramic slurry was high in both spreadability and peelability.

Examples 5 and 6

Except for mixing the release agent (A), crosslinking agent (B), and resin (C) at a mass ratio as specified in Table 1, the same procedure as in Example 1 was carried out to provide a laminated film. Characteristics of the resulting laminated film are shown in Tables 1, 2 and 3. Although the slurry peeling resistance was larger than in Example 1, the ceramic slurry was high in both spreadability and peelability.

Example 7

Except for using the undermentioned oxazoline compound (b-2) as the crosslinking agent (B), the same procedure as in Example 1 was carried out to provide a laminated film. Characteristics of the resulting laminated film are shown in Tables 1, 2 and 3. Although the slurry peeling resistance was larger than in Example 1, the ceramic slurry was high in both spreadability and peelability.
Oxazoline compound (b-2): EPOCROS (registered trademark) WS-500 (solid content 40 mass %, water as solvent) manufactured by Nippon Shokubai Co., Ltd.

Example 8

Except for using the undermentioned carbodiimide compound (b-3) as the crosslinking agent (B), the same procedure as in Example 1 was carried out to provide a laminated film. Characteristics of the resulting laminated film are shown in Tables 1, 2 and 3. Although the slurry peeling resistance was larger than in Example 1, the ceramic slurry was high in both spreadability and peelability.
Carbodiimide compound (b-3): CARBODILITE (registered trademark) V-04 (solid content 40 mass %, water as solvent) manufactured by Nisshinbo Chemical Inc.

Example 9

Except for using the undermentioned epoxy resin (b-4) as the crosslinking agent (B), the same procedure as in Example 1 was carried out to provide a laminated film. Characteristics of the resulting laminated film are shown in Tables 1, 2 and 3. Although the slurry peeling resistance was larger than in Example 1, the ceramic slurry was high in both spreadability and peelability.
Epoxy Resin (b-4): DENACOL (Registered Trademark) EX-512 (Solid Content 50 Mass %, Water as Solvent) Manufactured by Nagase ChemteX Corporation Example 10

Except for using the undermentioned isocyanate compound (b-5) as the crosslinking agent (B), the same procedure as in Example 1 was carried out to provide a laminated film. Characteristics of the resulting laminated film are shown in Tables 1, 2 and 3. Although the slurry peeling resistance was larger than in Example 1, the ceramic slurry was high in both spreadability and peelability.
Isocyanate compound (b-5): ELASTRON (registered trademark) E-37 (solid content 28%, water as solvent) manufactured by Dai-Ichi Kogyo Seiyaku Co., Ltd.

Example 11

Except for using the undermentioned polyester resin (c-2) as the resin (C), the same procedure as in Example 1 was carried out to provide a laminated film. Characteristics of the resulting laminated film are shown in Tables 1, 2 and 3. Although the slurry spreadability was low compared to Example 1, the ceramic slurry was high in both spreadability and peelability.
Polyester resin (c-2): Water dispersion of polyester resin composed of the copolymerization components below.
Copolymerization components
Dicarboxylic acid components
2,6-dimethyl naphthalene dicarboxylate: 88 mol %
sodium dimethyl 5-sulphoisophthalate: 12 mol %
Diol components
a compound produced by adding 2 moles of ethylene oxide to 1 mole of bisphenol S: 86 mol % 1,3-propanediol: 14 mol %
No fragments of M/Z=132 attributable to a structure as represented by formula (1) were detected when the coating composition containing this polyester resin (c-2) was analyzed by GCIB-TOF-SIMS, which is described in the section on the measuring methods.

Example 12

Except for using the undermentioned urethane resin (c-3) as the resin (C), the same procedure as in Example 1 was carried out to provide a laminated film. Characteristics of the resulting laminated film are shown in Tables 1, 2 and 3. Although the slurry peeling resistance was larger than in Example 1, the ceramic slurry was high in both spreadability and peelability. Urethane resin (c-3): HYDRAN (registered trademark) AP-40 (solid content 40 mass %) manufactured by DIC Corporation Example 13

First, except that, unlike the polyester film production procedure in Example 1, the coating of the uniaxial stretched film (film B) with a coating composition was omitted, the same procedure as in Example 1 was carried out to provide a polyester film in which crystal orientation had been completed. Then, this polyester film was coated with a coating composition as specified in Tables 1, 2 and 3 to a coating thickness of about 6 µm using a bar coater. Subsequently, it was dried in an oven at 100° C. for 20 seconds and then heat-treated in an oven at 240° C. for 20 seconds to form a resin layer to provide a laminated film. Characteristics of the resulting laminated film are shown in Tables 1, 2 and 3. Although the slurry peeling resistance was larger than in Example 1, the ceramic slurry was high in both spreadability and peelability.

Example 14

Except for using the undermentioned olefin based resin (a-2) as the release agent (A), the same procedure as in Example 1 was carried out to provide a laminated film. Characteristics of the resulting laminated film are shown in Tables 1, 2 and 3. Although the resin layer had a larger surface free energy and the slurry peeling resistance was larger than in Example 1, the ceramic slurry was high in both spreadability and peelability.
Olefin based resin (a-2): CHEMIPEARL (registered trademark) XEP800H manufactured by Mitsui Chemicals, Inc.

Examples 15 and 16

Except for changing the content of the release agent (A) as specified in Table 1, the same procedure as in Example 1 was carried out to provide a laminated film. Characteristics of the resulting laminated film are shown in Tables 1, 2 and 3. The ceramic slurry was high in both spreadability and peelability.

Example 17

Except for changing the content of the release agent (A) as specified in Table 1, the same procedure as in Example 1 was carried out to provide a laminated film. Characteristics of the resulting laminated film are shown in Tables 1, 2 and 3. Although the resin layer had a larger surface free energy and the slurry peeling resistance was larger than in Example 1, the ceramic slurry was high in both spreadability and peelability.

Example 18

Except for changing the content of the release agent (A) as specified in Table 1, the same procedure as in Example 1 was carried out to provide a laminated film. Characteristics of the resulting laminated film are shown in Tables 1, 2 and 3. Although the slurry peeling resistance was larger than in Example 1, the ceramic slurry was high in both spreadability and peelability.

Example 19

Except for using the undermentioned compound (x-1: having a structure as represented by formula (1)) as the compound (X), the same procedure as in Example 1 was carried out to provide a laminated film. Characteristics of the resulting laminated film are shown in Tables 1, 2 and 3. The surface smoothness was higher than in Example 1.
Compound (x-1): Adeka(R) Pluronic F-108 (weight average molecular weight 15,500) manufactured by Adeka Corporation Example 20

Except for using the undermentioned compound (x-2: having a structure as represented by formula (1)) as the compound (X), the same procedure as in Example 1 was carried out to provide a laminated film. Characteristics of the resulting laminated film are shown in Tables 1, 2 and 3. The surface smoothness was higher than in Example 1.
Compound (x-2): Adeka(R) Pluronic F-88 (weight average molecular weight 10,800) manufactured by Adeka Corporation Example 21

Except for using the undermentioned compound (x-3: having a structure as represented by formula (1)) as the compound (X), the same procedure as in Example 1 was carried out to provide a laminated film. Characteristics of the resulting laminated film are shown in Tables 1, 2 and 3. The surface smoothness was higher than in Example 1.
Compound (x-3): Adeka(R) Pluronic F-68 (weight average molecular weight 8,350) manufactured by Adeka Corporation Example 22

Except for using the undermentioned compound (x-4: having a structure as represented by formula (1)) as the compound (X), the same procedure as in Example 1 was carried out to provide a laminated film. Characteristics of the resulting laminated film are shown in Tables 1, 2 and 3. The surface smoothness was higher than in Example 1.
Compound (x-4): Surfynol 485 (weight average molecular weight 1,500) manufactured by Nissin Chemical Industry Co., Ltd.

Example 23

Except for changing the content of the compound (X) as specified in Table 1, the same procedure as in Example 19 was carried out to provide a laminated film. Characteristics of the resulting laminated film are shown in Tables 1, 2 and 3. The surface smoothness was at the same level as in Example 1.

Examples 24 and 25

Except for changing the content of the compound (X) as specified in Table 1, the same procedure as in Example 19 was carried out to provide a laminated film. Characteristics of the resulting laminated film are shown in Tables 1, 2 and 3. The surface smoothness was higher than in Example 1.

Examples 26 and 27

Except for changing the content of the compound (X) as specified in Table 1, the same procedure as in Example 19 was carried out to provide a laminated film. Characteristics of the resulting laminated film are shown in Tables 1, 2 and 3. The surface smoothness was higher, but the slurry peeling resistance was larger than in Example 1.

Example 28

Except for using the undermentioned compound (x-5: having a structure as represented by formula (1)) as the compound (X), the same procedure as in Example 1 was carried out to provide a laminated film. Characteristics of the resulting laminated film are shown in Tables 1, 2 and 3. The surface smoothness was higher, but the resistance to transfer was lower than in Example 1.
Compound (x-5): Surfynol 465 (weight average molecular weight 600) manufactured by Nissin Chemical Industry Co., Ltd.

Example 29

Except for using the undermentioned PVA (x-6: not having a structure as represented by formula (1)) as the compound (X), the same procedure as in Example 1 was carried out to provide a laminated film. Characteristics of the resulting laminated film are shown in Tables 1, 2 and 3. The surface smoothness was at the same level as in Example 1.
PVA (x-6): PVA-103 (weight average molecular weight 13,000) manufactured by Kuraray Co., Ltd.

Examples 30 to 33

Except for changing the content of the compound (X) as specified in Table 1, the same procedure as in Example 29 was carried out to provide a laminated film. Characteristics of the resulting laminated film are shown in Tables 1, 2 and 3. The surface smoothness was higher, but the slurry peeling resistance was larger than in Example 1.

Example 34

Except for using the undermentioned PVA (x-7: not having a structure as represented by formula (1)) as the compound (X), the same procedure as in Example 1 was carried out to provide a laminated film. Characteristics of the resulting laminated film are shown in Tables 1, 2 and 3. The surface smoothness was higher, but the slurry peeling resistance was larger than in Example 1.
PVA (x-7): PVA-105 (weight average molecular weight 22,000) manufactured by Kuraray Co., Ltd.

Example 35

Except for using the undermentioned silicone based resin (a-3) as the release agent (A) and mixing the release agent (A) and crosslinking agent (B) such that the solid content ratio of (A)/(B) was 70/30 by mass, the same procedure as in Example 1 was carried out to provide a laminated film. Characteristics of the resulting laminated film are shown in Tables 1, 2 and 3. Although the resin layer had a smaller surface free energy than in Example 1, the ceramic slurry was high in both spreadability and peelability.

Silicone Based Resin (a-3):

A coating material containing a silicone component (X-62-7655, manufactured by Shin-Etsu Chemical Co., Ltd.), another coating material containing a silicone component (X-62-7622, manufactured by Shin-Etsu Chemical Co., Ltd.), and a catalyst (CAT-7605, manufactured by Shin-Etsu Chemical Co., Ltd.) were mixed at a mass ratio of 95:5:1.

Example 36

Except for using the undermentioned long chain alkyl group-containing resin (a-4) as the release agent (A), the same procedure as in Example 1 was carried out to provide a laminated film. Characteristics of the resulting laminated film are shown in Tables 1, 2 and 3. Although the resin layer had a smaller water contact angle and the slurry peeling resistance was larger than in Example 1, the ceramic slurry was high in both spreadability and peelability.

Long chain alkyl group-containing resin (a-4)

Except for using octyl isocyanate instead of octadecyl isocyanate, the same production procedure as for the long chain alkyl group-containing resin (a-1) was carried out to synthesize a long chain alkyl group-containing resin (a-4: composed of a polymethylene backbone and a side chain having an alkyl group containing 8 carbon atoms).

Example 37

Except for using the undermentioned long chain alkyl group-containing resin (a-5) as the release agent (A), the same procedure as in Example 1 was carried out to provide a laminated film. Characteristics of the resulting laminated film are shown in Tables 1, 2 and 3. Although the resin layer had a smaller water contact angle and the slurry peeling resistance was larger than in Example 1, the ceramic slurry was high in both spreadability and peelability.

Long chain alkyl group-containing resin (a-5) Except for using dodecyl isocyanate instead of octadecyl isocyanate, the same production procedure as for the long chain alkyl group-containing resin (a-1) was carried out to synthesize a long chain alkyl group-containing resin (a-5: composed of a polymethylene backbone and a side chain having an alkyl group containing 12 carbon atoms).

Examples 38 and 39

Except for changing the thickness of the resin layer as specified in Table 2, the same procedure as in Example 1 was carried out to provide a laminated film. Characteristics of the resulting laminated film are shown in Tables 1, 2 and 3. Although the slurry peeling resistance was large, the ceramic slurry was high in both spreadability and peelability.

Examples 40 and 41

Resin (C): Acrylic Resin (c-4)

In a stainless steel reaction container, methyl methacrylate (a), hydroxyethyl methacrylate ((3), urethane acrylate oligomer (ARTRESIN (registered trademark) UN-3320HA, manufactured by Negami Kogyo Co., Ltd., six acryloyl groups) (γ) were fed at a (a)/((3)/(γ) ratio of 94.5/0.5/5 by mass, and sodium dodecylbenzenesulfonate was added as emulsifier to 2 parts by mass relative to the total of (α) to (γ), which accounted for 100 parts by mass, followed by stirring to prepare a liquid mixture 1. Next, a reactor equipped with a stirrer, reflux cooling pipe, thermometer, and dropping funnel was set up. Then, 60 parts by mass of the liquid mixture 1, 200 parts by mass of isopropyl alcohol, and 5 parts by mass of potassium persulfate as polymerization initiator were fed in the reactor and heated to 60° C. to prepare a liquid mixture 2. The liquid mixture 2 was maintained in a heated state at 60° C. for 20 minutes. Next, 40 parts by mass of the liquid mixture 1, 50 parts by mass of isopropyl alcohol, and 5 parts by mass of potassium persulfate were mixed to prepare a liquid mixture 3. Then, using a dropping funnel, the liquid mixture 3 was dropped in the liquid mixture 2 over 2 hours to prepare a liquid mixture 4. Subsequently, the liquid mixture 4 was maintained in a heated state at 60° C. for 2 hours. The resulting liquid mixture 4 was cooled to below 50° C. and poured in a container equipped with a stirrer and decompression device. Then, 60 parts by mass of 25% aqueous ammonia and 900 parts by mass of pure water were added, followed by collecting isopropyl alcohol and the unreacted monomers while heating at 60° C. under reduced pressure to obtain an acrylic resin (c-4) dispersed in pure water.

Except for using the (c-4) as the resin (C), changing the content of the release agent (A) as specified in Table 1, and changing the thickness of the resin layer as specified in Table 2, the same procedure as in Example 1 was carried out to provide a laminated film. Characteristics of the resulting laminated film are shown in Tables 1, 2 and 3.

Examples 42 and 43

Resin (C): Acrylic Resin (c-4)

In a stainless steel reaction container, methyl methacrylate (α), hydroxyethyl methacrylate (β), urethane acrylate oligomer (ARTRESIN (registered trademark) UN-3320HA, manufactured by Negami Kogyo Co., Ltd., six acryloyl groups) (γ) were fed at a (α)/(β)/(γ) ratio of 90/5/5/by mass, and sodium dodecylbenzenesulfonate was added as emulsifier to 2 parts by mass relative to the total of (α) to (γ), which accounted for 100 parts by mass, followed by stirring to prepare a liquid mixture 1. Next, a reactor equipped with a stirrer, reflux cooling pipe, thermometer, and dropping funnel was set up. Then, 60 parts by mass of the liquid mixture 1, 200 parts by mass of isopropyl alcohol, and 5 parts by mass of potassium persulfate as polymerization initiator were fed in the reactor and heated to 60° C. to prepare a liquid mixture 2. The liquid mixture 2 was maintained in a heated state at 60° C. for 20 minutes. Next, 40 parts by mass of the liquid mixture 1, 50 parts by mass of isopropyl alcohol, and 5 parts by mass of potassium persulfate were mixed to prepare a liquid mixture 3. Then, using a dropping funnel, the liquid mixture 3 was dropped in the liquid mixture 2 over 2 hours to prepare a liquid mixture 4. Subsequently, the liquid mixture 4 was maintained in a heated state at 60° C. for 2 hours. The resulting liquid mixture 4 was cooled to below 50° C. and poured in a container equipped with a stirrer and decompression device. Then, 60 parts by mass of 25% aqueous ammonia and 900 parts by mass of pure water were added, followed by collecting isopropyl alcohol and the unreacted monomers while heating at 60° C. under reduced pressure to obtain an acrylic resin (c-5) dispersed in pure water.

Except for using the (c-5) as the resin (C), changing the content of the release agent (A) as specified in Table 1, and changing the thickness of the resin layer as specified in Table 2, the same procedure as in Example 1 was carried out to provide a laminated film. Characteristics of the resulting laminated film are shown in Tables 1, 2 and 3.

Examples 44 and 45

In Example 44, except for using the undermentioned diethylene glycol (x-8: not having a structure as represented by formula (1)) as the compound (X) and changing the thickness of the resin layer as specified in Table 2, the same procedure as in Example 1 was carried out to provide a laminated film. Characteristics of the resulting laminated film are shown in Tables 1, 2 and 3.

Comparative Example 1

Except for not using the crosslinking agent (B) or the resin (C), the same procedure as in Example 1 was carried out to provide a laminated film. Characteristics of the resulting laminated film are shown in Tables 1, 2 and 3. The water contact angle was larger than 100° and the ceramic slurry was low in spreadability. In addition, the ceramic slurry was lower in peelability than in Example 1.

Comparative Example 2

Except not using the resin (C) and mixing the release agent (A) and the crosslinking agent (B) at a (A)/(B) ratio of 100/50, the same procedure as in Example 1 was carried out to provide a laminated film. Characteristics of the resulting laminated film are shown in Tables 1, 2 and 3. The water contact angle was larger than 100° and the ceramic slurry was low in spreadability. In addition, the ceramic slurry was lower in peelability than in Example 1.

Comparative Example 3

Except for not using the crosslinking agent (B), the same procedure as in Example 1 was carried out to provide a laminated film. Characteristics of the resulting laminated film are shown in Tables 1, 2 and 3. The water contact angle was larger than 100° and the ceramic slurry was low in spreadability. In addition, the ceramic slurry was lower in peelability than in Example 1.

Comparative Example 4

Except for using a combination of methylolated melamine (b-1) and an oxazoline compound (b-2) as the crosslinking agent (B), the same procedure as in Comparative example 2 was carried out to provide a laminated film. Characteristics of the resulting laminated film are shown in Tables 1, 2 and 3. Although the ceramic slurry was high in peelability, the water contact angle was larger than 100° and the ceramic slurry was low in spreadability.

Comparative Example 5

Except for using the undermentioned long chain alkyl acrylate compound (a-6) as the release agent (A), the same procedure as in Comparative example 1 was carried out to provide a laminated film. Characteristics of the resulting laminated film are shown in Tables 1, 2 and 3. Although the water contact angle was not larger than 100° and the ceramic slurry was high in spreadability, the ceramic slurry was lower in peelability than in Example 1.

Long Chain Alkyl Acrylate Compound (a-6)

In a temperature-controllable reaction vessel equipped with a stirrer, thermometer, and capacitor, 500 parts by mass of toluene, 80 parts by mass of stearyl methacrylate (with an alkyl chain containing 18 carbon atoms), 15 parts by mass of methacrylic acid, 5 parts by mass of 2-hydroxyethyl methacrylate, and 1 part by mass of azobisisobutyronitrile were put in a liquid dropping device and dropped over 4 hours while maintaining the reaction temperature at 85° C. to perform a polymerization reaction. Subsequently, maturation was performed for 2 hours at the same temperature to complete the reaction and the resulting compound was dissolved in water containing 5 mass % of isopropyl alcohol and 5 mass % of n-butyl cellosolve to provide a solution containing a long chain alkyl acrylate compound (a-6).

Comparative Example 6

Except for using the long chain alkyl acrylate compound (a-6) as the release agent (A), the same procedure as in Example 1 was carried out to provide a laminated film. Characteristics of the resulting laminated film are shown in Tables 1, 2 and 3. The water contact angle was smaller than 85° and the ceramic slurry was low in peelability.

Comparative Example 7

Except for not using the release film agent (A), the same procedure as in Example 1 was carried out to provide a laminated film. Characteristics of the resulting laminated film are shown in Tables 1, 2 and 3. The water contact angle was smaller than 85° and the ceramic slurry was low in peelability.

Comparative Example 8

Except for changing the content of the release agent (A) as specified in Table 1, the same procedure as in Example 1 was carried out to provide a laminated film. Characteristics of the resulting laminated film are shown in Tables 1, 2 and 3. The water contact angle was larger than 100° and the ceramic slurry was low in spreadability.

TABLE 1

| | Type | | | | | | Ratio (solid content ratio by mass) | | | | |
|---|---|---|---|---|---|---|---|---|---|---|---|
| | Release agent (A) | | Cross-linking agent (B) | Resin (C) | Catalyst (D) | Compound (X) | Weight average molecular weight of compound (X) | Release agent (A) | Cross-linking agent (B) | Resin (C) | Catalyst (D) | Compound (X) |
| | type | number of carbon atoms | | | | | | | | | | |
| Example 1 | (a-1) | 18 | (b-1) | (c-1) | — | — | — | 20 | 20 | 80 | — | — |
| Example 2 | (a-1) | 18 | (b-1) | (c-1) | (d-1) | — | — | 20 | 20 | 80 | 3 | — |
| Example 3 | (a-1) | 18 | (b-1) | (c-1) | — | — | — | 20 | 5 | 95 | — | — |
| Example 4 | (a-1) | 18 | (b-1) | (c-1) | — | — | — | 20 | 50 | 50 | — | — |
| Example 5 | (a-1) | 18 | (b-1) | (c-1) | — | — | — | 20 | 2 | 98 | — | — |
| Example 6 | (a-1) | 18 | (b-1) | (c-1) | — | — | — | 20 | 70 | 30 | — | — |
| Example 7 | (a-1) | 18 | (b-2) | (c-1) | — | — | — | 20 | 20 | 80 | — | — |
| Example 8 | (a-1) | 18 | (b-3) | (c-1) | — | — | — | 20 | 20 | 80 | — | — |
| Example 9 | (a-1) | 18 | (b-4) | (c-1) | — | — | — | 20 | 20 | 80 | — | — |
| Example 10 | (a-1) | 18 | (b-5) | (c-1) | — | — | — | 20 | 20 | 80 | — | — |
| Example 11 | (a-1) | 18 | (b-1) | (c-2) | — | — | — | 20 | 20 | 80 | — | — |
| Example 12 | (a-1) | 18 | (b-1) | (c-3) | — | — | — | 20 | 20 | 80 | — | — |
| Example 13 | (a-1) | 18 | (b-1) | (c-1) | — | — | — | 20 | 20 | 80 | — | — |
| Example 14 | (a-2) | x | (b-1) | (c-1) | — | — | — | 20 | 20 | 80 | — | — |
| Example 15 | (a-1) | 18 | (b-1) | (c-1) | — | — | — | 5 | 20 | 80 | — | — |
| Example 16 | (a-1) | 18 | (b-1) | (c-1) | — | — | — | 50 | 20 | 80 | — | — |
| Example 17 | (a-1) | 18 | (b-1) | (c-1) | — | — | — | 3 | 20 | 80 | — | — |
| Example 18 | (a-1) | 18 | (b-1) | (c-1) | — | — | — | 70 | 20 | 80 | — | — |
| Example 19 | (a-1) | 18 | (b-1) | (c-1) | — | (x-1) | 15,500 | 20 | 20 | 80 | — | 12 |
| Example 20 | (a-1) | 18 | (b-1) | (c-1) | — | (x-2) | 10800 | 20 | 20 | 80 | — | 12 |
| Example 21 | (a-1) | 18 | (b-1) | (c-1) | — | (x-3) | 8,350 | 20 | 20 | 80 | — | 12 |
| Example 22 | (a-1) | 18 | (b-1) | (c-1) | — | (x-4) | 1,500 | 20 | 20 | 80 | — | 12 |
| Example 23 | (a-1) | 18 | (b-1) | (c-1) | — | (x-1) | 15,500 | 20 | 20 | 80 | — | 2 |
| Example 24 | (a-1) | 18 | (b-1) | (c-1) | — | (x-1) | 15,500 | 20 | 20 | 80 | — | 3 |
| Example 25 | (a-1) | 18 | (b-1) | (c-1) | — | (x-1) | 15,500 | 20 | 20 | 80 | — | 6 |
| Example 26 | (a-1) | 18 | (b-1) | (c-1) | — | (x-1) | 15,500 | 20 | 20 | 80 | — | 20 |
| Example 27 | (a-1) | 18 | (b-1) | (c-1) | — | (x-1) | 15,500 | 20 | 20 | 80 | — | 22 |
| Example 28 | (a-1) | 18 | (b-1) | (c-1) | — | (x-5) | 600 | 20 | 20 | 80 | — | 12 |
| Example 29 | (a-1) | 18 | (b-1) | (c-1) | — | (x-6) | 13,000 | 20 | 20 | 80 | — | 2 |
| Example 30 | (a-1) | 18 | (b-1) | (c-1) | — | (x-6) | 13,000 | 20 | 20 | 80 | — | 3 |
| Example 31 | (a-1) | 18 | (b-1) | (c-1) | — | (x-6) | 13,000 | 20 | 20 | 80 | — | 6 |
| Example 32 | (a-1) | 18 | (b-1) | (c-1) | — | (x-6) | 13,000 | 20 | 20 | 80 | — | 20 |
| Example 33 | (a-1) | 18 | (b-1) | (c-1) | — | (x-6) | 13,000 | 20 | 20 | 80 | — | 22 |
| Example 34 | (a-1) | 18 | (b-1) | (c-1) | — | (x-7) | 22,000 | 20 | 20 | 80 | — | 12 |
| Example 35 | (a-3) | x | (b-1) | — | — | — | — | 70 | 30 | — | — | — |
| Example 36 | (a-4) | 8 | (b-1) | (c-1) | — | — | — | 20 | 20 | 80 | — | — |
| Example 37 | (a-5) | 12 | (b-1) | (c-1) | — | — | — | 20 | 20 | 80 | — | — |
| Example 38 | (a-1) | 18 | (b-1) | (c-1) | — | — | — | 20 | 20 | 80 | — | — |
| Example 39 | (a-1) | 18 | (b-1) | (c-1) | — | — | — | 20 | 20 | 80 | — | — |
| Example 40 | (a-1) | 18 | (b-1) | (c-4) | — | — | — | 5 | 20 | 80 | — | — |
| Example 41 | (a-1) | 18 | (b-1) | (c-4) | — | — | — | 5 | 20 | 80 | — | — |
| Example 42 | (a-1) | 18 | (b-1) | (c-5) | — | — | — | 5 | 20 | 80 | — | — |
| Example 43 | (a-1) | 18 | (b-1) | (c-5) | — | — | — | 5 | 20 | 80 | — | — |
| Example 44 | (a-1) | 18 | (b-1) | (c-1) | — | (x-8) | 106 | 20 | 20 | 80 | — | 12 |
| Example 45 | (a-1) | 18 | (b-1) | (c-1) | — | (x-8) | 106 | 20 | 20 | 80 | — | 12 |
| Comparative example 1 | (a-1) | 18 | — | — | — | — | — | 100 | — | — | — | — |
| Comparative example 2 | (a-1) | 18 | (b-1) | — | — | — | — | 100 | 50 | — | — | — |
| Comparative example 3 | (a-1) | 18 | — | (c-1) | — | — | — | 20 | — | 100 | — | — |
| Comparative example 4 | (a-1) | 18 | (b-1) (b-2) | — | — | — | — | 100 | 2040 | — | — | — |
| Comparative example 5 | (a-6) | 18 | — | — | — | — | — | 100 | — | — | — | — |
| Comparative example 6 | (a-6) | 18 | (b-1) | (c-1) | — | — | — | 20 | 20 | 80 | — | — |
| Comparative example 7 | — | x | (b-1) | (c-1) | — | — | — | — | 20 | 80 | — | — |
| Comparative example 8 | (a-1) | 18 | (b-1) | (c-1) | — | — | — | 100 | 20 | 80 | — | — |

TABLE 2

| | Water contact angle (°) | Surface free energy (mn/m) | H2-H1 (%) | Peak intensity ratio p/k | Release layer thickness (nm) | Production method |
|---|---|---|---|---|---|---|
| Example 1 | 97 | 28 | 0.15 | less than 0.001 | 60 | in-line coating |
| Example 2 | 97 | 28 | 0.04 | less than 0.001 | 60 | in-line coating |
| Example 3 | 100 | 26 | 0.32 | less than 0.001 | 60 | in-line coating |
| Example 4 | 98 | 28 | 0.26 | less than 0.001 | 60 | in-line coating |
| Example 5 | 100 | 26 | 0.53 | less than 0.001 | 60 | in-line coating |
| Example 6 | 97 | 27 | 0.57 | less than 0.001 | 60 | in-line coating |
| Example 7 | 96 | 27 | 0.96 | less than 0.001 | 60 | in-line coating |
| Example 8 | 99 | 26 | 0.79 | less than 0.001 | 60 | in-line coating |
| Example 9 | 98 | 27 | 0.76 | less than 0.001 | 60 | in-line coating |
| Example 10 | 98 | 27 | 0.73 | less than 0.001 | 60 | in-line coating |
| Example 11 | 100 | 24 | 0.35 | less than 0.001 | 60 | in-line coating |
| Example 12 | 97 | 28 | 0.76 | less than 0.001 | 60 | in-line coating |
| Example 13 | 96 | 27 | 0.62 | less than 0.001 | 60 | off-line coating |
| Example 14 | 85 | 31 | 0.22 | less than 0.001 | 60 | in-line coating |
| Example 15 | 93 | 29 | 0.13 | less than 0.001 | 60 | in-line coating |
| Example 16 | 99 | 26 | 0.22 | less than 0.001 | 60 | in-line coating |
| Example 17 | 85 | 30 | 0.14 | less than 0.001 | 60 | in-line coating |
| Example 18 | 100 | 25 | 0.27 | less than 0.001 | 60 | in-line coating |
| Example 19 | 96 | 28 | 0.17 | less than 0.001 | 60 | in-line coating |
| Example 20 | 97 | 28 | 0.17 | less than 0.001 | 60 | in-line coating |
| Example 21 | 98 | 27 | 0.13 | less than 0.001 | 60 | in-line coating |
| Example 22 | 97 | 28 | 0.15 | less than 0.001 | 60 | in-line coating |
| Example 23 | 98 | 27 | 0.11 | less than 0.001 | 60 | in-line coating |
| Example 24 | 97 | 28 | 0.12 | less than 0.001 | 60 | in-line coating |
| Example 25 | 97 | 28 | 0.13 | less than 0.001 | 60 | in-line coating |
| Example 26 | 96 | 28 | 0.33 | less than 0.001 | 60 | in-line coating |
| Example 27 | 95 | 28 | 0.58 | less than 0.001 | 60 | in-line coating |
| Example 28 | 97 | 28 | 0.14 | less than 0.001 | 60 | in-line coating |
| Example 29 | 97 | 27 | 0.15 | less than 0.001 | 60 | in-line coating |
| Example 30 | 97 | 27 | 0.30 | less than 0.001 | 60 | in-line coating |
| Example 31 | 97 | 27 | 0.57 | less than 0.001 | 60 | in-line coating |
| Example 32 | 96 | 28 | 0.83 | less than 0.001 | 60 | in-line coating |
| Example 33 | 95 | 28 | 0.94 | less than 0.001 | 60 | in-line coating |
| Example 34 | 97 | 28 | 0.76 | less than 0.001 | 60 | in-line coating |
| Example 35 | 100 | 13 | 0.33 | 0.65 | 50 | in-line coating |
| Example 36 | 88 | 33 | 0.18 | less than 0.001 | 60 | in-line coating |
| Example 37 | 91 | 32 | 0.17 | less than 0.001 | 60 | in-line coating |
| Example 38 | 94 | 29 | 0.55 | less than 0.001 | 30 | in-line coating |
| Example 39 | 91 | 30 | 0.95 | less than 0.001 | 10 | in-line coating |
| Example 40 | 94 | 29 | 0.18 | less than 0.001 | 60 | in-line coating |
| Example 41 | 91 | 30 | 0.63 | less than 0.001 | 30 | in-line coating |
| Example 42 | 99 | 28 | 0.10 | less than 0.001 | 60 | in-line coating |
| Example 43 | 96 | 28 | 0.38 | less than 0.001 | 30 | in-line coating |
| Example 44 | 98 | 27 | 0.16 | less than 0.001 | 60 | in-line coating |
| Example 45 | 98 | 27 | 0.51 | less than 0.001 | 30 | in-line coating |
| Comparative example 1 | 105 | 22 | 1.25 | less than 0.001 | 50 | in-line coating |
| Comparative example 2 | 103 | 23 | 1.01 | less than 0.001 | 75 | in-line coating |
| Comparative example 3 | 102 | 25 | 1.22 | less than 0.001 | 60 | in-line coating |
| Comparative example 4 | 101 | 24 | 0.66 | less than 0.001 | 80 | in-line coating |
| Comparative example 5 | 96 | 30 | 1.19 | less than 0.001 | 50 | in-line coating |
| Comparative example 6 | 84 | 34 | 0.15 | less than 0.001 | 60 | in-line coating |
| Comparative example 7 | 77 | 39 | 0.12 | less than 0.001 | 50 | in-line coating |
| Comparative example 8 | 101 | 25 | 0.34 | less than 0.001 | 80 | in-line coating |

TABLE 3

| | Slurry spread-ability | Slurry peelability | | Phase separability in outer layer | | | | Resistance to transfer | Surface smoothness |
|---|---|---|---|---|---|---|---|---|---|
| | | Slurry peeling resistance (mn/cm) | Evaluation | θ1 (°) | θ2 (°) | θ2 − θ1 (°) | Evaluation | | |
| Example 1 | S | 13 | S | 86 | 93 | 7 | S | S | A |
| Example 2 | S | 12 | S | 87 | 93 | 6 | S | S | A |
| Example 3 | A | 33 | A | 89 | 93 | 4 | A | S | A |
| Example 4 | S | 21 | A | 88 | 93 | 5 | A | S | A |
| Example 5 | A | 50 | B | 89 | 93 | 4 | A | S | A |
| Example 6 | S | 40 | B | 89 | 93 | 4 | A | S | A |
| Example 7 | S | 72 | B | 89 | 93 | 4 | A | S | A |
| Example 8 | S | 77 | B | 89 | 93 | 4 | A | S | A |
| Example 9 | S | 74 | B | 89 | 93 | 4 | A | S | A |
| Example 10 | S | 70 | B | 89 | 93 | 4 | A | S | A |
| Example 11 | A | 37 | A | 89 | 92 | 3 | B | S | A |
| Example 12 | S | 72 | B | 88 | 93 | 5 | A | S | A |
| Example 13 | S | 52 | B | 89 | 93 | 4 | A | S | A |
| Example 14 | S | 46 | B | 89 | 93 | 4 | A | S | A |
| Example 15 | S | 32 | A | 89 | 93 | 4 | A | S | A |
| Example 16 | A | 29 | A | 89 | 93 | 4 | A | S | B |
| Example 17 | S | 79 | B | 89 | 93 | 4 | A | S | A |
| Example 18 | B | 44 | B | 89 | 93 | 4 | A | S | B |
| Example 19 | S | 18 | S | 87 | 93 | 6 | S | S | S |
| Example 20 | S | 16 | S | 87 | 93 | 6 | S | A | S |
| Example 21 | S | 14 | S | 86 | 93 | 7 | S | B | S |
| Example 22 | S | 13 | S | 87 | 93 | 6 | S | C | S |
| Example 23 | S | 13 | S | 86 | 93 | 7 | S | S | A |
| Example 24 | S | 16 | S | 87 | 93 | 6 | S | S | S |
| Example 25 | S | 28 | A | 87 | 93 | 6 | S | S | S |
| Example 26 | S | 33 | A | 87 | 93 | 6 | S | S | S |
| Example 27 | S | 42 | B | 87 | 93 | 6 | S | S | S |
| Example 28 | S | 14 | S | 87 | 93 | 6 | S | C | S |
| Example 29 | S | 18 | S | 86 | 93 | 7 | S | S | A |
| Example 30 | S | 22 | A | 86 | 93 | 7 | S | S | S |
| Example 31 | S | 38 | A | 87 | 93 | 6 | S | S | S |
| Example 32 | S | 64 | B | 87 | 93 | 6 | S | S | S |
| Example 33 | S | 78 | B | 87 | 93 | 6 | S | S | S |
| Example 34 | S | 65 | B | 87 | 93 | 6 | S | S | S |
| Example 35 | B | 5 | S | 91 | 91 | 0 | C | B | B |
| Example 36 | S | 68 | B | 89 | 93 | 4 | A | S | A |
| Example 37 | S | 39 | A | 89 | 93 | 4 | A | S | A |
| Example 38 | S | 21 | A | 88 | 93 | 5 | A | S | A |
| Example 39 | S | 42 | B | 89 | 93 | 4 | A | S | A |
| Example 40 | S | 37 | A | 89 | 93 | 4 | A | S | A |
| Example 41 | S | 44 | B | 90 | 93 | 3 | B | S | A |
| Example 42 | S | 27 | A | 89 | 93 | 4 | A | S | A |
| Example 43 | S | 35 | A | 90 | 93 | 3 | B | S | A |
| Example 44 | S | 14 | S | 86 | 93 | 7 | S | B | S |
| Example 45 | S | 22 | A | 88 | 93 | 5 | A | B | S |
| Comparative example 1 | C | 103 | C | 90 | 93 | 3 | B | S | B |
| Comparative example 2 | C | 84 | C | 90 | 93 | 3 | B | S | B |
| Comparative example 3 | C | 133 | C | 90 | 93 | 3 | B | S | A |
| Comparative example 4 | C | 22 | A | 90 | 93 | 3 | B | S | B |
| Comparative example 5 | S | 85 | C | 88 | 93 | 5 | A | S | A |
| Comparative example 6 | S | 95 | C | 90 | 92 | 2 | B | S | A |
| Comparative example 7 | S | 196 | C | 92 | 91 | −1 | C | S | S |
| Comparative example 8 | C | 60 | B | 90 | 93 | 3 | B | S | B |

INDUSTRIAL APPLICABILITY

The laminated film has a surface layer such as of ceramic slurry, with high spreadability and peelability and can be used suitably as process film for manufacturing a laminated ceramic electronic components such as inductor elements.

The invention claimed is:

1. A laminated film comprising a polyester film and a resin layer disposed on at least one surface thereof, wherein the resin layer is disposed on at least either of outermost layers thereof; the resin layer has a water contact angle of 85° or more and 100° or less; and the relation |H2−H1|≤1.0 (%) is satisfied where H1 (%) represents haze of the laminated film and H2 (%) represents the haze of the laminated film after a solvent immersion and abrasion test comprising, after immersing the laminated film in methyl ethyl ketone for 10 minutes, a piece of cotton cloth (Haize Gauze NT-4, manufactured by Ozu Corporation) is moved back and forth ten times under a load of 1 kg to abrade the surface of the resin layer using a Gakushin rubbing tester.

2. The laminated film as set forth in claim 1, wherein, according to analysis of the surface of the resin layer by time-of-flight secondary ion mass spectrometry, the P/K ratio [-] is less than 0.01 where P represents peak intensity of the fragment attributed to dimethyl siloxane and K represents peak intensity attributed to the fragment detected with the maximum strength.

3. The laminated film as set forth in claim 1, wherein the resin layer is formed from a coating composition containing a release agent (A), at least one crosslinking agent (B) selected from the group consisting of epoxy resin, melamine resin, oxazoline compound, carbodiimide compound, and isocyanate compound, and at least one resin (C) selected from the group consisting of polyester resin, acrylic resin, and urethane resin.

4. The laminated film as set forth in claim 3, wherein the release agent (A) has an alkyl group containing 12 or more carbon atoms.

5. The laminated film as set forth in claim 4, wherein the resin having an alkyl group containing 12 or more carbon atoms is a resin having a polymethylene backbone chain and an alkyl side chain containing 12 or more carbon atoms.

6. The laminated film as set forth in claim 3, wherein, in the coating composition, the release agent (A) accounts for 5 to 50 parts by mass relative to the total amount of the crosslinking agent (B) and the resin (C), which accounts for 100 parts by mass.

7. The laminated film as set forth in claim 3, wherein, in the coating composition, the mass ratio between the crosslinking agent (B) and the resin (C) is 5/95 to 50/50.

8. The laminated film as set forth in claim 3, wherein the coating composition contains a compound (X) having a structure as represented by formula (1):

$$-(CH_2-CH_2-O)_n- \qquad (1)$$

wherein n is an integer of 3 or greater.

9. The laminated film as set forth in claim 8, wherein the compound (X) has a weight average molecular weight of 1,000 or more and 20,000 or less.

10. The laminated film as set forth in claim 8, wherein, in the coating composition, the compound (X) accounts for 15 to 100 parts by mass relative to the release agent (A), which accounts for 100 parts by mass.

11. The laminated film as set forth in claim 1, wherein the resin layer has a thickness of more than 10 nm and less than 80 nm.

12. The laminated film as set forth in claim 1, wherein the resin layer has a surface free energy of 20 mN/m or more and 30 mN/m or less.

13. The laminated film as set forth in claim 1, wherein the resin layer provides a surface on which a ceramic slurry is spread and solidified, followed by peeling.

14. The laminated film as set forth in claim 13, wherein the ceramic slurry contains ferrite.

15. A method of producing the laminated film as set forth in claim 1 comprising spreading a coating composition containing a release agent (A) on at least one surface of a polyester film in which crystal orientation has not been completed, subsequently stretching the polyester film at least uniaxially, and subsequently heat-treating the polyester film to complete the crystal orientation in the polyester film.

* * * * *